United States Patent [19]

Michaels et al.

[11] Patent Number: 4,766,019
[45] Date of Patent: Aug. 23, 1988

[54] CARBONATED BEVERAGE CAN AND METHOD FOR PRODUCING A CARBONATED BEVERAGE CAN

[75] Inventors: Nicholas Michaels; William H. Korcz, both of Houston; R. Neil Campbell, Katy, all of Tex.; Surendra N. Singhal, Tulsa, Okla.

[73] Assignee: Shell Oil Company, Houston, Tex.

[21] Appl. No.: 885,507

[22] Filed: Jul. 14, 1986

[51] Int. Cl.$^4$ .................... B65D 23/08; B65H 81/00
[52] U.S. Cl. ........................................ 428/35; 156/185; 156/187; 156/188; 220/453; 220/468; 428/377
[58] Field of Search ............... 428/35, 377; 220/453, 220/468; 156/185, 187, 188

[56] References Cited

U.S. PATENT DOCUMENTS

| | | | |
|---|---|---|---|
| 4,144,111 | 3/1979 | Schaerer | 156/187 |
| 4,163,827 | 8/1979 | Nieman et al. | 428/377 |
| 4,181,239 | 1/1980 | Heiremans et al. | 428/35 |
| 4,514,245 | 4/1985 | Chabrier | 156/187 |
| 4,640,853 | 2/1987 | Schmeal et al. | 428/35 |
| 4,642,252 | 2/1987 | Sasaki et al. | 428/35 |

Primary Examiner—John E. Kittle
Assistant Examiner—James J. Seidleck

[57] ABSTRACT

The present invention resides in a method for producing a carbonated beverage can which has acceptable creep, modulus and yield strength values, which comprises a can body, which is made up of a core of a thermoplastic material, at least two layers of non-fibrous, extruded polyolefin film which has either been monoaxially stretched or biaxially stretched, [and which are wrapped around the core singularly or in plys at opposite plus/minus angles in relationship to each other to yield disproportionate stress resistance vectors for hoop and axial stresses present in said body at a 2:1 ratio] one layer of which is wrapped around said core singularly or in plys at an angle with respect to said core of from about +60° to about +80° and the other of said two layers is wrapped around said core singularly or in plys at an angle with respect to said core of from about −60° to about −80°, an adhesive layer which is placed between the core and the layers of polyolefin in order to adhere the layers to the core as well as the layers to themselves and at least one layer of a barrier material, and ends which are attached [by some suitable method] to the can body.

25 Claims, 18 Drawing Sheets

SIMPLIFIED CUTAWAY SCHEMATIC OF CAN BODY WITH CORE AND TWO WRAPPED STRENGTH LAYERS.

① EXTRUDED CORE MATERIAL
② FIRST STRENGTH LAYER, PLUS ANGLE (α)
③ SECOND STRENGTH LAYER, MINUS ANGLE (α)

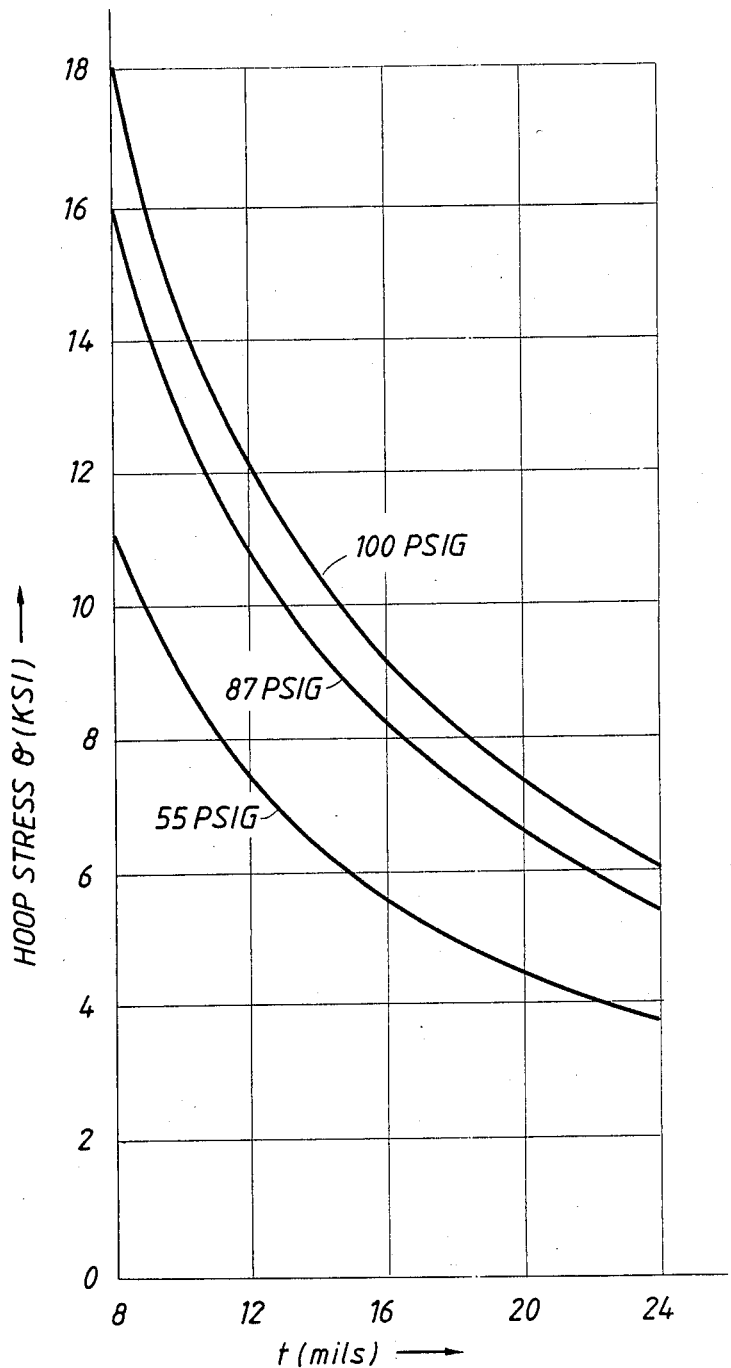
FIG. 2
HOOP STRESS vs. INTERNAL PRESSURE AT CORRESPONDING WALL THICKNESS: 12 OUNCE CAN
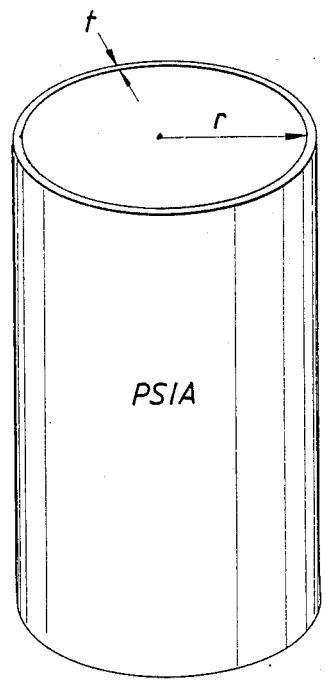
$r = 1.29''$
HOOP STRESS: $\sigma = p_a r / t$
WHERE
$p_a$ = PRESSURE
$r$ = RADIUS
$t$ = WALL THICKNESS YIELD STRESS vs. DEFORMATION FOR EXAMPLE MATERIALS ABOVE AND BELOW A REFERENCE HOOP STRESS

⊙ = TENSILE YIELD POINT ON CURVES

\* AFTER CONSIDERABLE VOLUME SWELL, THESE MATERIALS FAIL BY SPLITTING OR BURSTING.

FIG. 5
VOLUME SWELL AS A FUNCTION OF MATERIAL MODULUS AND WALL THICKNESS FOR A 12 OUNCE CAN
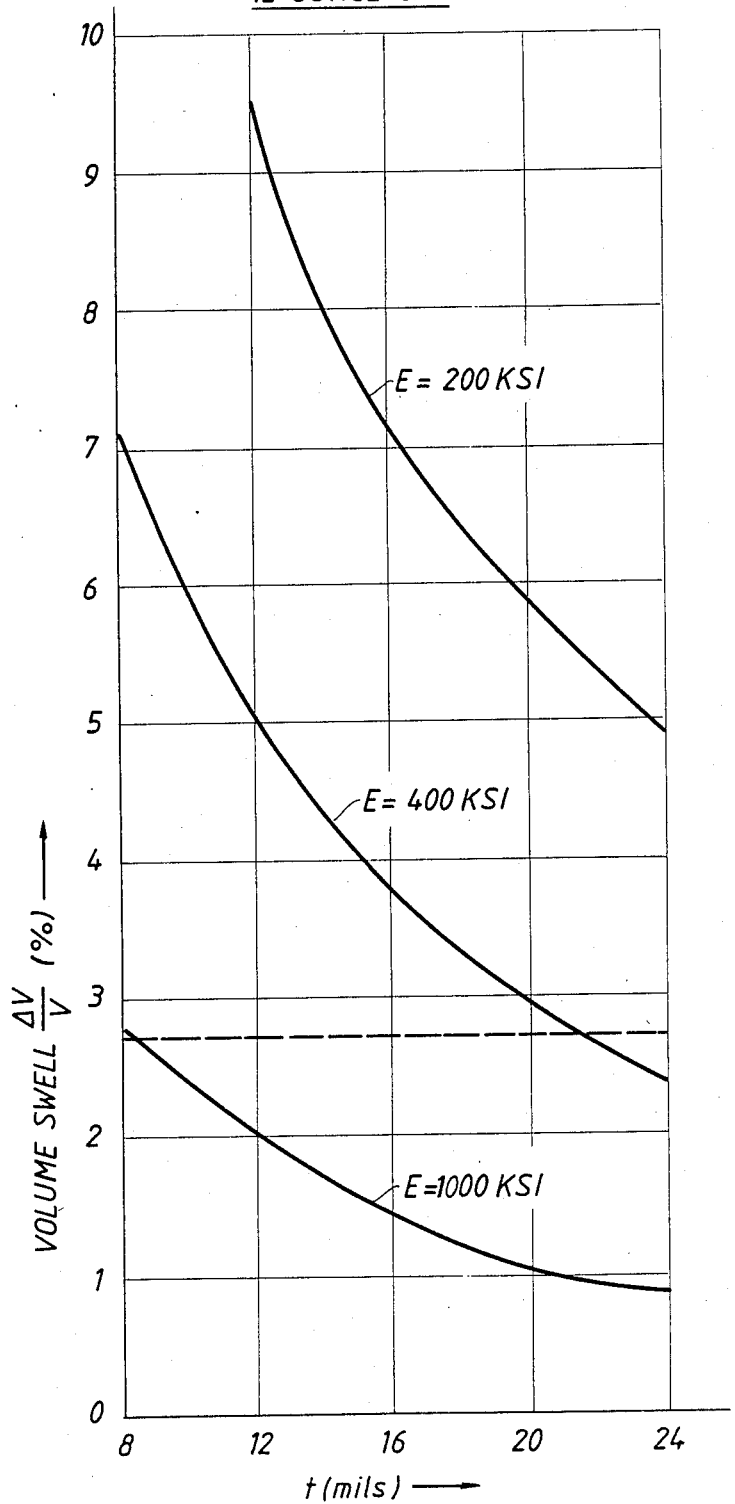
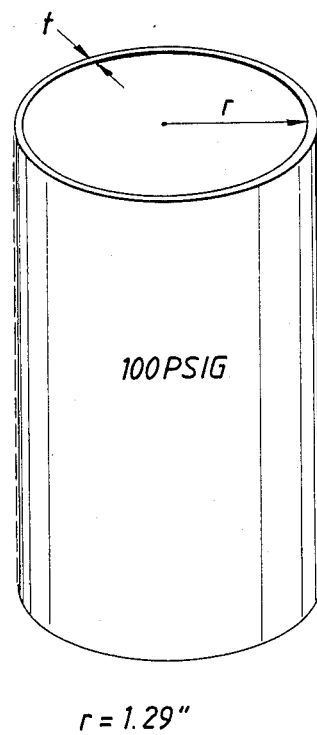
r = 1.29"

YIELD STRESS AND MODULUS vs. DEFORMATION FOR EXAMPLE MATERIALS ABOVE AND BELOW A REFERENCE HOOPSTRESS AND REFERENCE MODULUS.

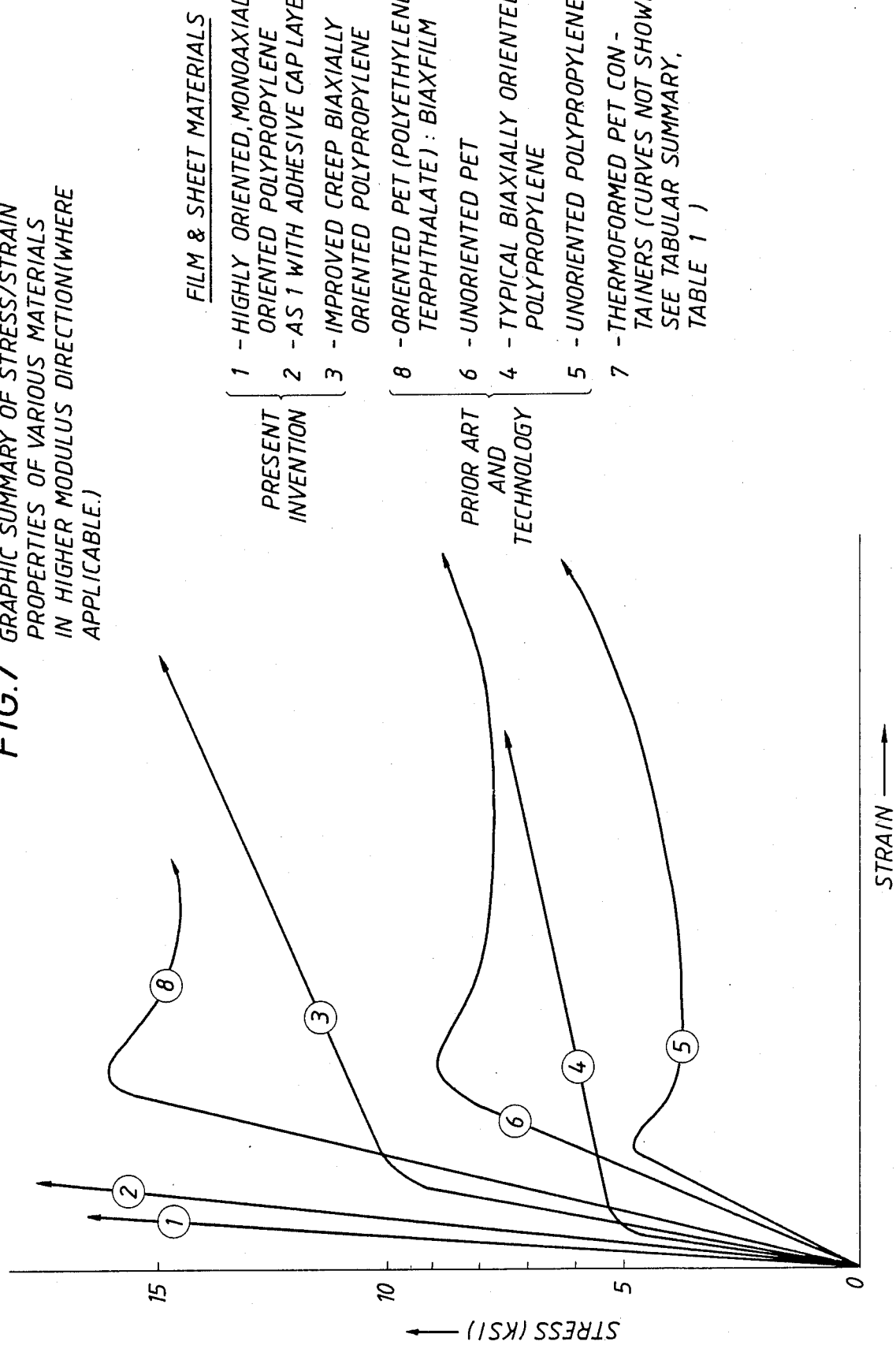

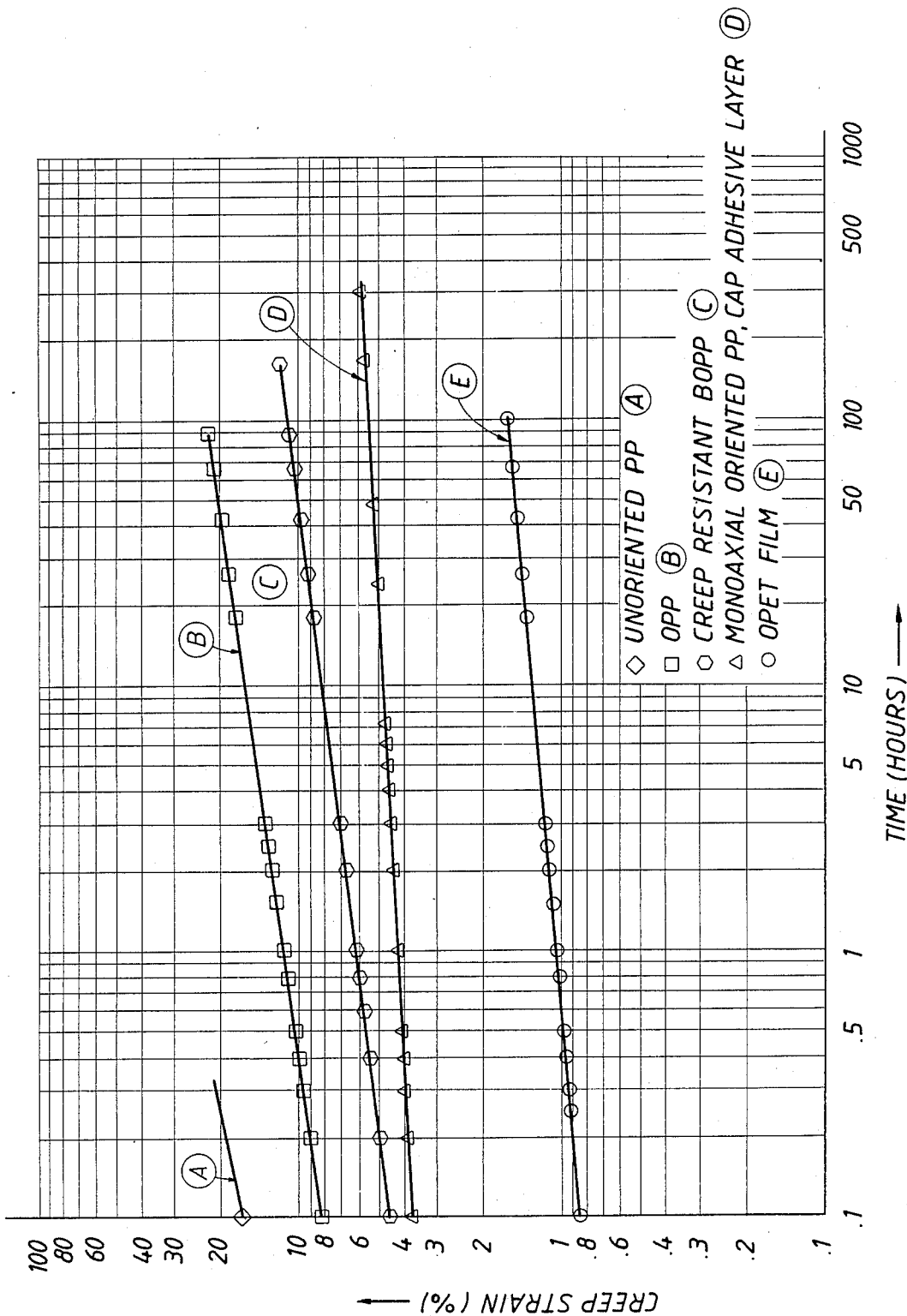

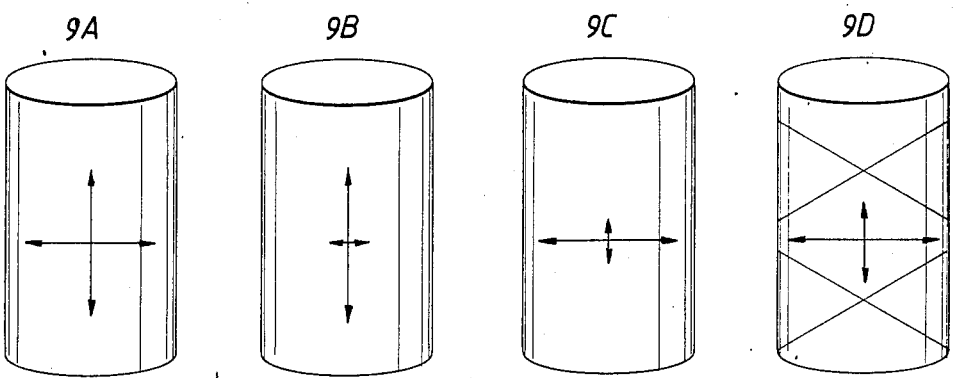

| | 9A | 9B | 9C | 9D |
|---|---|---|---|---|
| EXAMPLE TECHNOLOGIES | HOMOGENEOUS: ISOTROPIC WALL: METAL OR WRAPPED FILM OR INJECTION MOLDED CAN | UNBALANCED: AXIAL RESISTANT THERMO FORMED PLASTIC OR D & I PLASTIC | UNBALANCED: RADIAL RESISTANT CONVOLUTE WRAPPED OR FORMED | BALANCED INSTANT INVENTION WITH PLUS/MINUS WRAPPED OR WOUND FILM OR SHEET AT ANGLE ($\alpha$) |
| OBSERVATION | NO OPPORTUNITY TO BALANCE STRESS RESISTANCE VECTORS TO OPTIMIZE HOOP VERSUS AXIAL PERFORMANCE | PRIMARY STRESS RESISTANCE VECTOR IS IN AXIAL DIRECTION DUE TO THERMO-FORMING AND ORIENTATION OF PLASTIC IN AXIAL DIRECTION | PROPERTIES DEPENDENT UPON EXACT ISOTROPIC OR ANISOTROPIC PROPERTIES OF FORMED OR WRAPPED MATERIAL | SATISFIES NEED FOR BIDIRECTIONAL AND UNBALANCED HOOP AND AXIAL STRESS RESISTANCE @ 2:1 |
| CONSEQUENCE | LARGER STRESS VECTOR MUST BE SATISFIED IN THICKER WALL OF HOMOGENEOUS MATERIAL | THICKER WALL MUST BE USED TO OVERCOME HOOP STRESS RESISTANCE DEFICIENCY | CONTINUOUS MANUFACTURE NOT POSSIBLE | OPTIMIZED USE OF MATERIALS TO MEET STRESSES AT REDUCED WALL THICKNESS |

FIG. 9
STRESS RESISTANCE VECTORS FOR EXAMPLE TECHNOLOGIES AND PRESENT INVENTION

| | 10A (OR 9C) | 10B | 10C |
|---|---|---|---|
| | 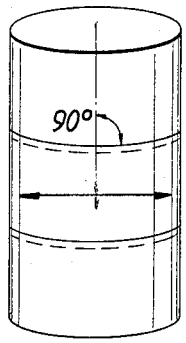 | 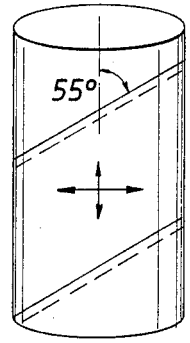 | 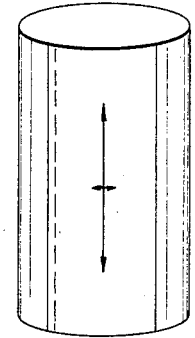 |
| FILM LAYERS | ONE | ONE | ONE |
| FILM WRAP ANGLE | +90° | +55° | NEUTRAL, 0° |
| OBSERVATION | NO OPPORTUNITY FOR FOR CONTINUOUS MANUFACTURE; UNSATISFACTORY AXIAL STRESS RESISTANCE VECTOR FOR HOOP VECTOR GIVEN | INITIAL HOOP STRESS RESISTANCE VECTOR BECOMES LOWER AS WRAP ANGLE CHANGES WHILE AXIAL STRESS RESISTANCE VECTOR IS INCREASING | EXTREME LOSS IN HOOP STRESS RESISTANCE VECTOR AS WRAP ANGLE CHANGES WHILE AXIAL STRESS RESISTANCE VECTOR REACHES ITS MAXIMUM |
| CONSEQUENCE | AXIAL STRESS RESISTANCE VECTOR MUST BE SATISFIED IN THICKER WALL. CONTAINER WALL SPLITTY ALONG HOOP AXIS | HOOP STRESS RESISTANCE VECTOR MUST BE SATISFIED IN THICKER WALL. CONTAINER WALL SPLITTY ALONG WRAP ANGLE DIRECTION. | HOOP STRESS RESISTANCE VECTOR MUST BE SATISFIED IN MUCH THICKER WALL. CONTAINER WALL SPLITTY ALONG AXIAL AXIS. |

FIG.10

PROPERTIES OF UNIDIRECTIONALLY WRAPPED CONSTRUCTIONS AT VARIOUS CONSTANT ANGLES.

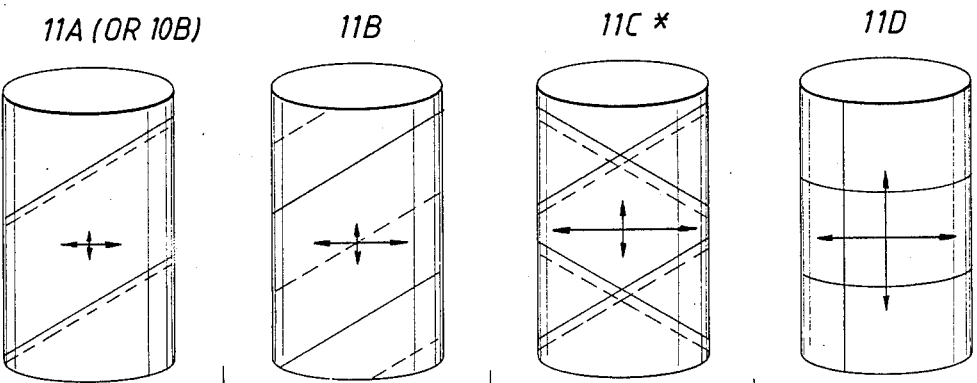

| | 11A (OR 10B) | 11B | 11C * | 11D |
|---|---|---|---|---|
| FILM LAYERS | ONE | TWO | TWO | TWO |
| FILM WRAP ANGLE(S) | +55° | +55°, +55° | +55°, -55° | 0°, 90° |
| OBSERVATION | HOOP AND AXIAL STRESS RESISTANCE VECTORS UNBALANCED AND INSUFFICIENT TO MEET HOOP AND AXIAL DESIGN STRESSES AT WALL = t/2 TORQUING, TWISTING, AND SPLITTING WHEN PRESSURIZED | HOOP AND AXIAL STRESS RESISTANCE VECTORS IMPROVED, BUT BUT INSUFFICIENT TO MEET HOOP AND AXIAL DESIGN STRESSES AT WALL = t TORQUING, TWISTING, AND SPLITTING WHEN PRESSURIZED | HOOP AND AXIAL STRESS RESISTANCE VECTORS BALANCED @ 2:1 AND SUFFICIENT TO MEET HOOP AND AXIAL DESIGN STRESSES AT WALL = t NO TORQUING OR TWISTING WHEN PRESSURIZED | INEFFICIENT HOOP AND AXIAL STRESS VECTOR @ 1:1 |
| CONSEQUENCE | FAILURE UNDER CONDITIONS OF USE | FAILURE UNDER CONDITIONS OF USE. IF t, THICKNESS, IS EQUAL TO MAXIMUM THICKNESS CONSTRAINT, THEN UNIDIRECTIONAL WRAP DESIGN IMPOSSIBLE TO SATISFY CARBONATED BEVERAGE CAN NEEDS | MEETS THICKNESS CONSTRAINTS AND PERFORMANCE CONSTRAINTS. | NO POSSIBILITY FOR CONTINUOUS MANUFACTURE DUE TO 90° WRAP CONSTRAINTS |

\* OUR INVENTION

FIG.11
STRESS RESISTANCE VECTORS FOR UNIDIRECTIONAL AND CROSSPLIED LAYERD CONSTRUCTIONS.

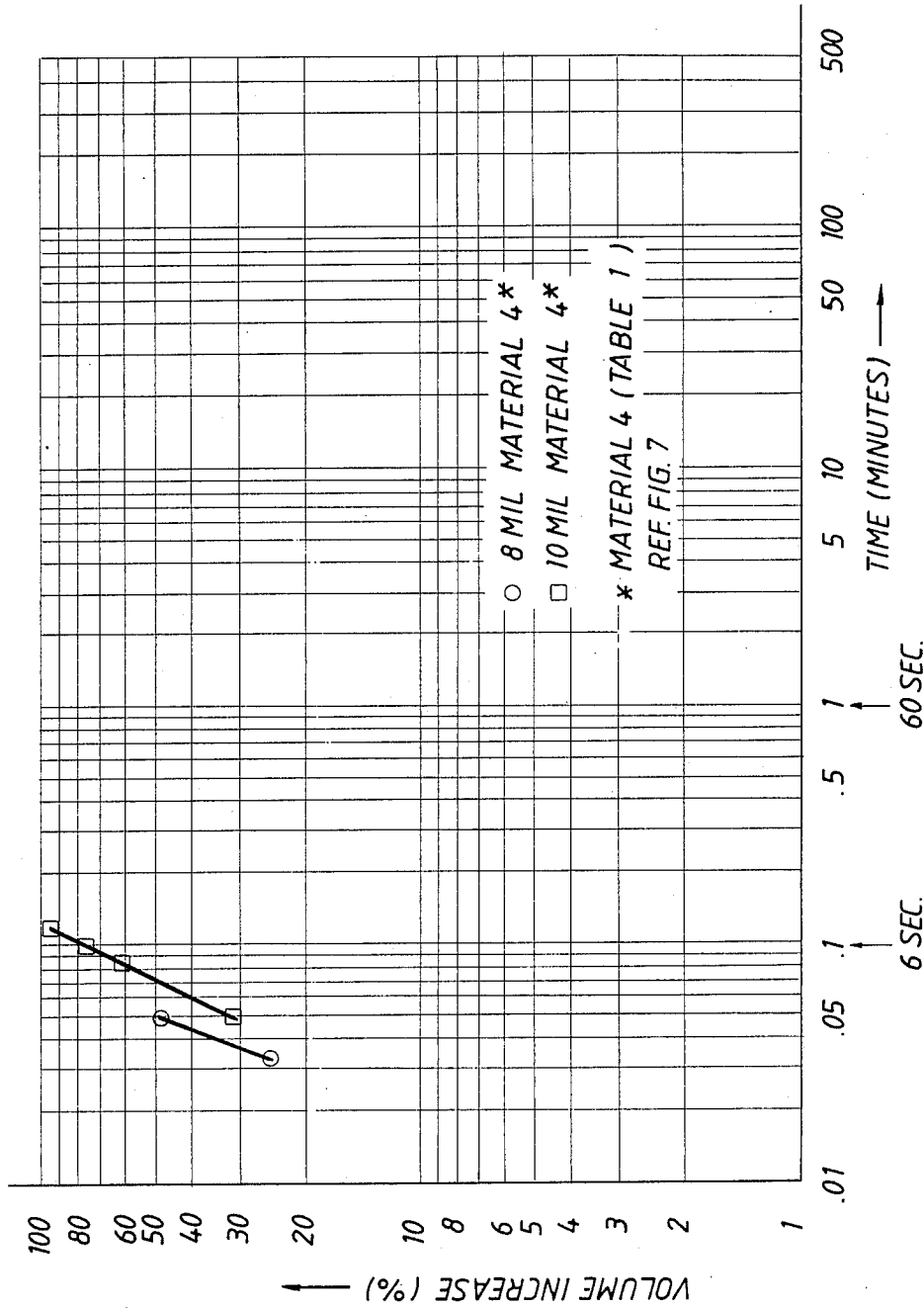

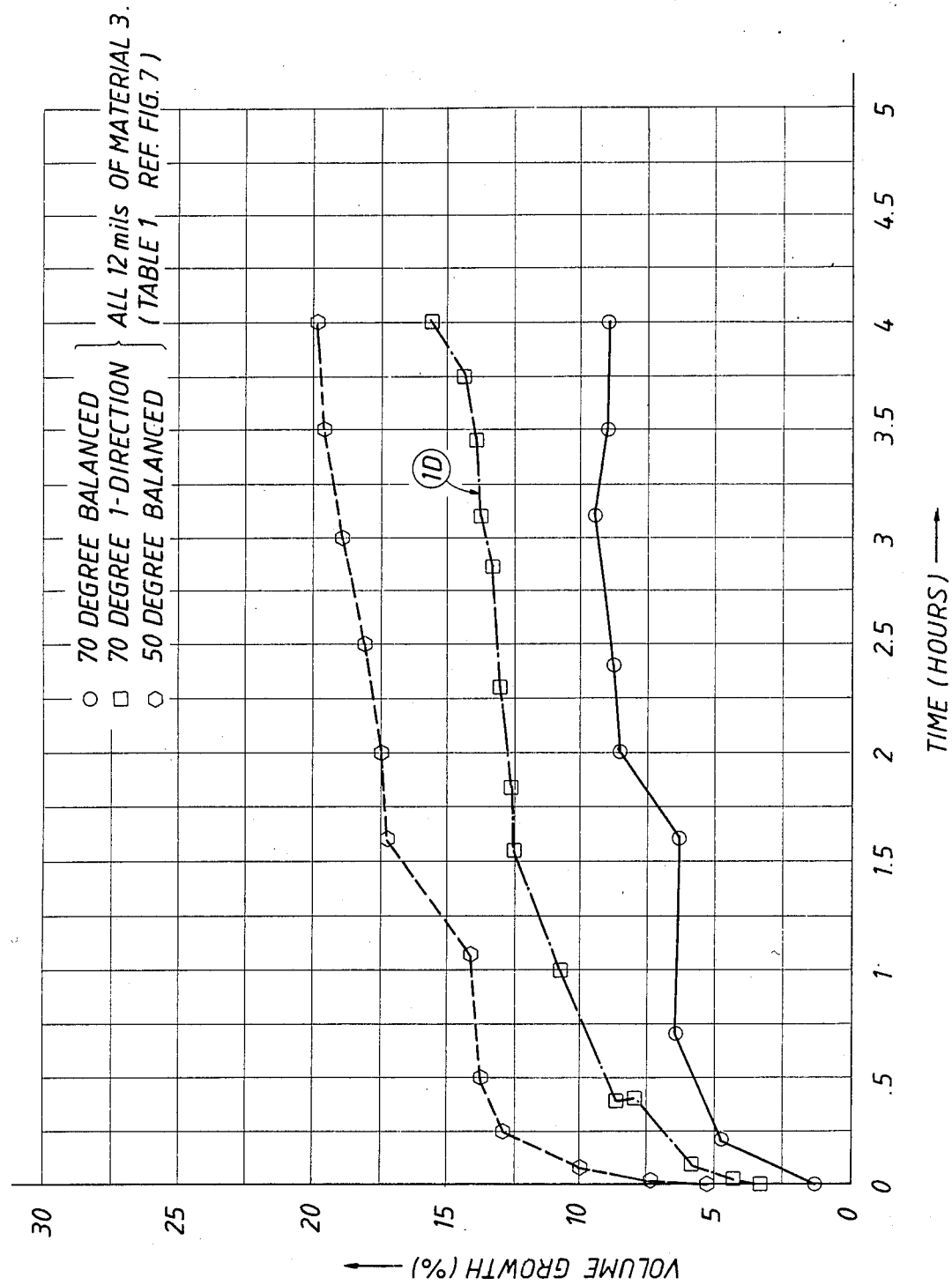

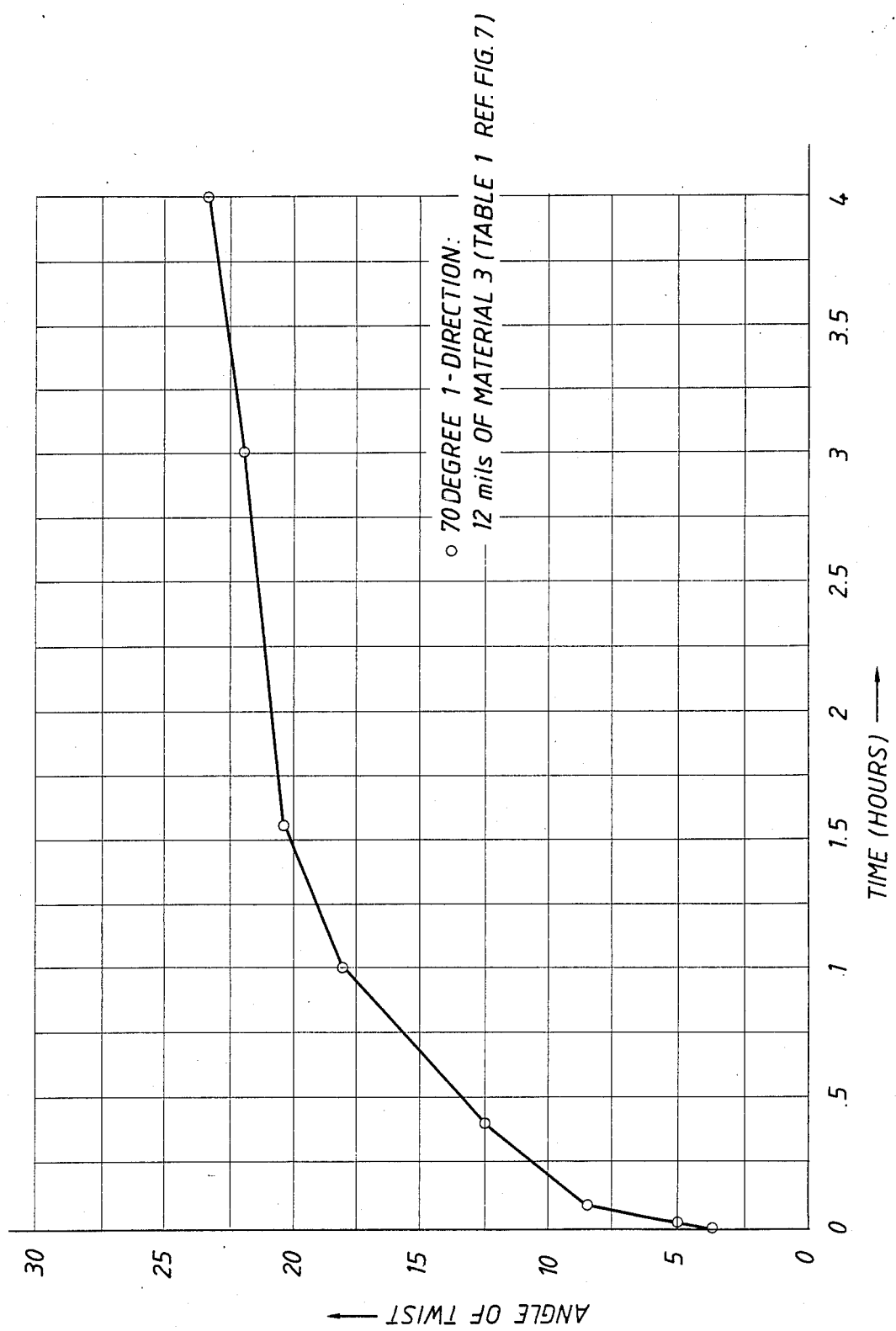
FIG. 14 TWISTING/TORQUING: 100 PSI @ 110°F
70 DEGREE 1-DIRECTION:
12 mils OF MATERIAL 3 (TABLE 1 REF. FIG. 7)

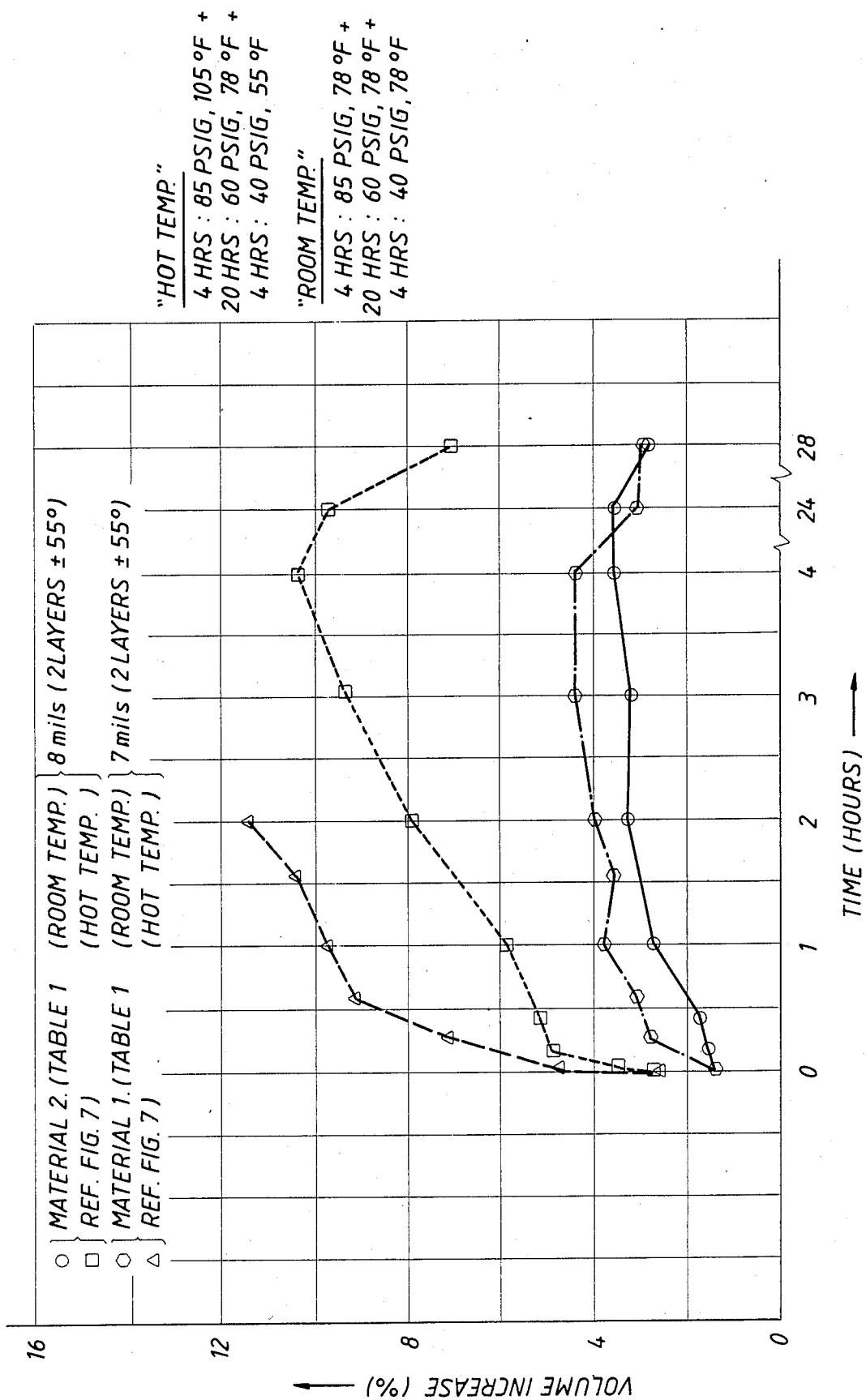

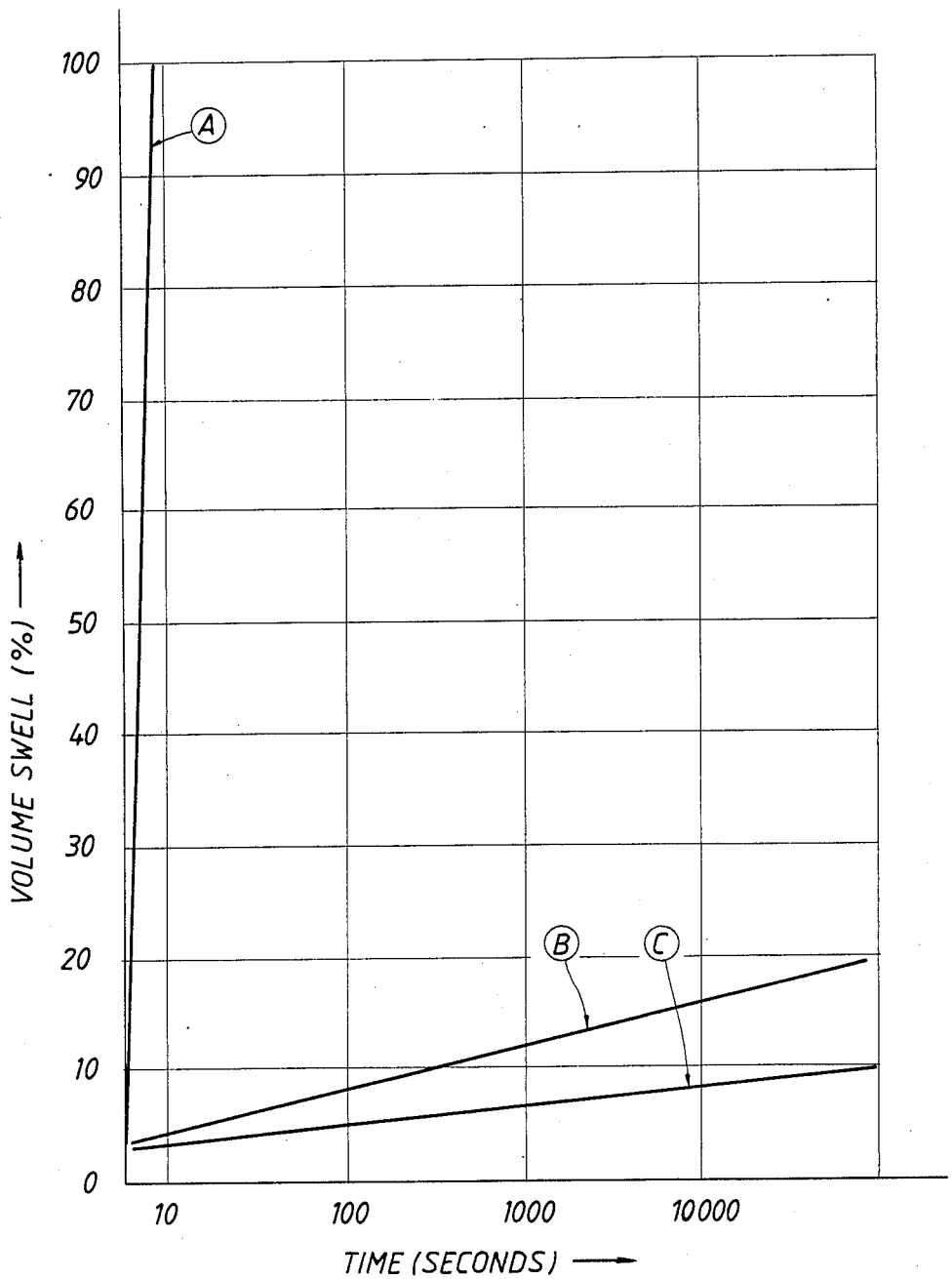

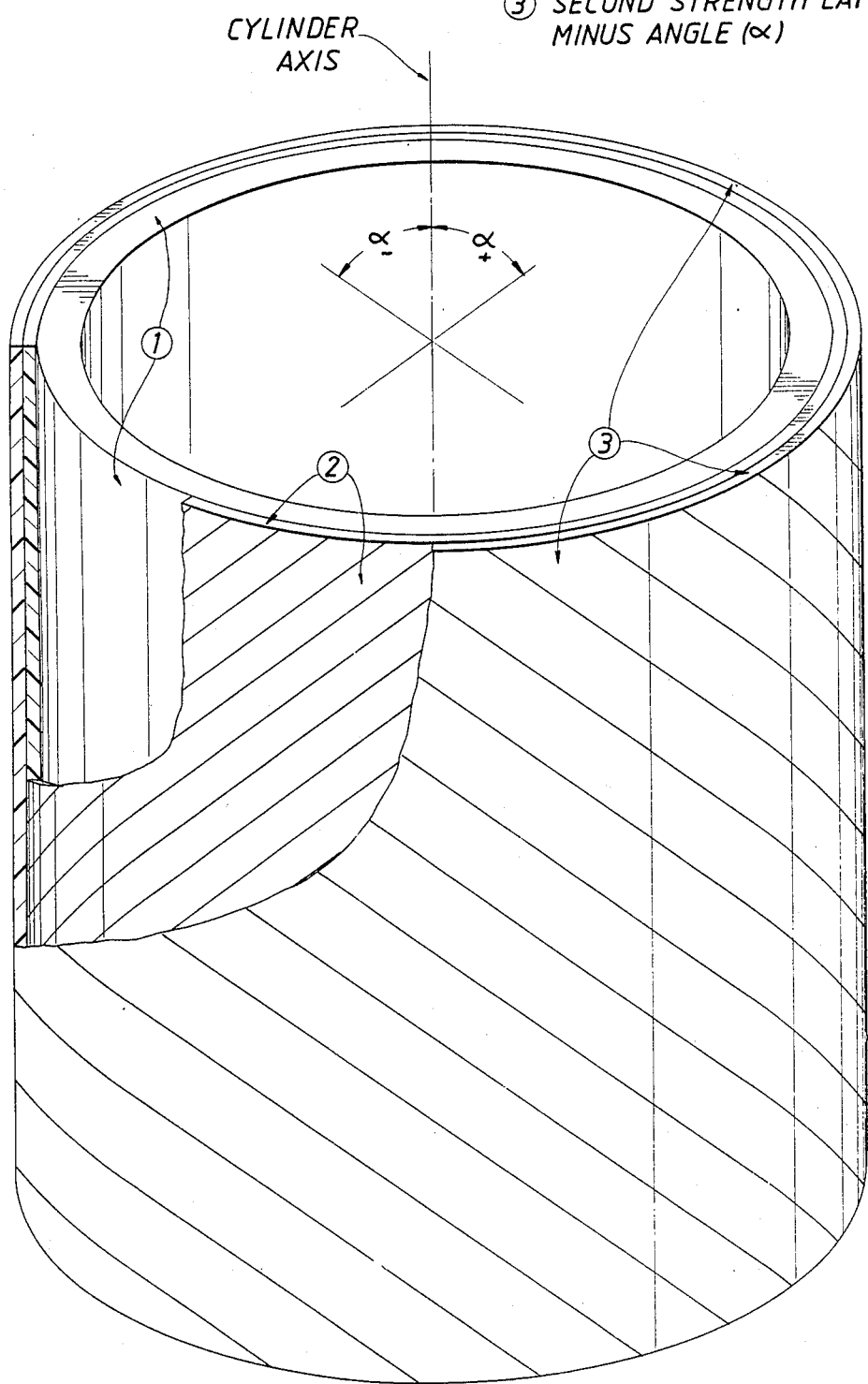

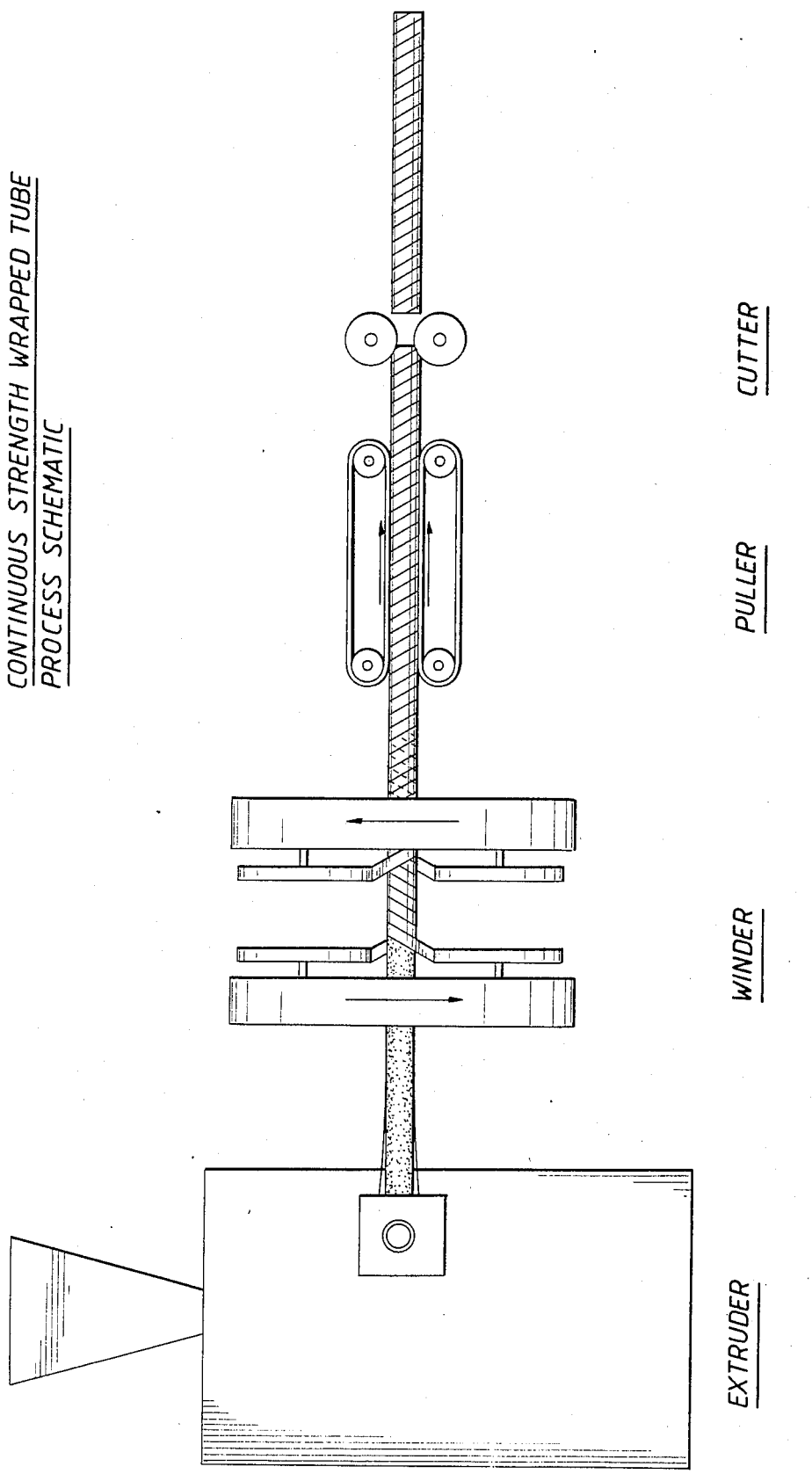

CARBONATED BEVERAGE CAN AND METHOD FOR PRODUCING A CARBONATED BEVERAGE CAN

BACKGROUND OF THE INVENTION

This invention relates to a method for producing a carbonated beverage can. More particularly, it relates to a method for producing a thin wall thermoplastic carbonated beverage can based on a polyolefin which has acceptable yield strength, modulus, and creep resistance values.

U.S. Pat. No. 4,379,014 discloses a method for the manufacture of packing containers. A container body is manufactured by spiral winding of the monoaxially molecular-oriented *polyester* film. A polyester strip which is monoaxially molecular oriented in the strip direction is coated with a layer of non-molecular oriented amorphous *polyester* material. The coating layers may be polyethylene as is disclosed at Column 2, lines 60–63. However, as the specification of U.S. Pat. No. 4,379,014 states in Column 2, lines 63–67, sometimes the polyethylene materials do not give good sealant strength or the overlapped joint that the material requires is too wide. This results in a lack of good adhesion and as a result, the coating material may need to be a modified polyester (PETG). The polyester strip of U.S. Pat. No. 4,379,014 is wrapped around the can body in only one direction.

U.S. Pat. No. 4,181,239 discloses a cylindrical container body for packaging pressurized carbonated beverages, however, it requires at least two layers of a *polyester* film.

U.S. Pat. No. 4,451,524 discloses a polypropylene strap for use in packaging articles. The polypropylene strap does not require subjection to a surface embossing process to prevent it from being longitudinally split and in addition has a tensile strength higher than that of conventional polypropylene strap and good elongation resistance, high rigidity and is flexible. This patent does not address the problems inherent in a pressurized container, such as a carbonated beverage container, such as the necessity for sufficient volume swell resistance in both hoop and axial directions.

Copending application, K-4466, Ser. No. 646,387 was filed Aug. 31, 1984, and discloses a method of manufacturing a pressure pipe by mixing a *blend* of polypropylene and polybutylene, extruding the blend into film, stretching the film and heating to a temperature between the two melting points of the polypropylene and the polybutylene, forming said film into tapes, and forming the tape into pipe lengths. However, the pipe produced according to K-4466 does not disclose the high modulus values and acceptable creep resistance and yield strength values of applicant's invention. Applicant's invention is not a blend and need not be heated to a temperature between the melting point of polypropylene and polybutylene. In actuality, a blend might weaken the carbonated beverage can of applicant's invention.

Numerous factors govern the requirements for a carbonated beverage container. For example, in soft drink beverages, (1) *container vendability* in coin operated machines is a key requirement. A 12 ounce can must fit into and dispense from the many existing vending machines. The overall outside dimensions of any 12 ounce can are constrained, limited and fixed to those ordinarily found for the aluminum and steel cans for which the vending machines have been designed to accept and to vend. Also, the beverage capacity in the can—12 ounces—is fixed. Therefore, the can diameter, can height and can wall thickness must be designed in concert to satisfy 12 ounce can vendability requirements.

Another key factor is (2) *consistency of dimensions under conditions of storage*, be it in a warehouse, on a delivery truck or on a supermarket shelf. A carbonated beverage can is a pressure vessel. Typical soft drink beverages will have an internal pressuire of about 55 psig once the beverage is filled with four volumes of $CO_2$ gas, sealed with an end or lid and then brought to room temperature. With temperatures rising much above 105° F., internal pressures of about 87 psig are achieved as the $CO_2$ gas expands and exerts a higher internal pressure as it warms. This is the pressure at which a conventional easy open metal end on a metal can will buckle. Below this temperature and pressure, the can sidewall material must not appreciably creep, deform or grow in size to an unacceptable level. The can body must not split, twist, torque or otherwise fail up to this lid buckling pressure of 87 psig. It is known that for a cylindrical shell or a cylindrical can body, hoop direction pressure induced stress in the can body sidewall is twice as large as the axial direction pressure induced stress in the can body sidewall. With metal cans for carbonated beverages the can body material is necessarily homogeneous and monolayer, i.e. it consists of a uniform gauge and thickness material of singular components, e.g. thin aluminum or thin steel sidewall material. In such monolayer, homogeneous material containers, including homogeneous, monolayer plastic containers, the can sidewall must necessarily be engineered so that the more severe design criterion—the hoop stress—is satisfied. Therefore, monolayer, homogeneous can bodies have been limited to always satisfying the more severe hoop stress requirement while being over engineered (by default) in satisfying the less demanding criterion, the axial stress requirement.

A container for which the can body sidewall materials and method of layered construction provide a disproportionation of stress resisting properties such that the 2:1 hoop stress to axial stress forces in a cylindrical can body geometry are better satisfied, has been long needed in the industry.

Can performance, that is, satisfactory sidewall resistance to the stresses created by the internal pressure of the carbonation, is largely governed by key can wall material properties; namely, (1) *elastic modulus*, (2) *initial tensile yield strength;* and (3) *creep resistance* is also a significant factor. Ultimate breaking strength or ultimate breaking elongation are of little consequence. The elastic modulus of the sidewall material must be sufficiently high so that deformation, i.e. volume swell of the container, is minimized. The initial tensile yield strength must be sufficiently high so that the sidewall stresses, (these stresses are a function of sidewall thickness, pressurization level and can diameter (for hoop stress)) are resisted and little strain (deformation) occurs. The properties of high modulus and high yield strength in combination are the key to satisfying the *thinnest* wall possible, especially when the construction is achieved as taught in our invention to *disproportionate* these properties to satisfy the unbalanced hoop and axial stresses in the can sidewall.

One necessity for thin wall has been recited. Other crucial factors, such as end and top seaming of end closures, faster beverage cooling, minimization of the number of layers to be wrapped to facilitate manufacturing, the lessening of the number of adhesive layers necessary to bond wound layers in the construction, and lighter weight depend upon achieving the thinnest wall possible as taught in our invention.

It has been discovered that a polyolefin, and most particularly, polypropylene can be used to manufacture a thin wall carbonated beverage can, and that the use of a polyolefin or polypropylene, when oriented to a degree which assures high modulus and high initial tensile yield strength (for example, when compared to the modulus and initial tensile yield strength values for PET polyester or oriented PET), allows for thin-walled carbonated beverage containers. This results in less use of thermoplastic materials in making the can and thus greater efficiency in its manufacture. By "thin-wall", we mean a wall thickness of less than 80 mils, preferably less than 50 mils, and most preferably less than 30 mils.

Heretofore, *unoriented* polypropylene films and sheet have been used for various other applications but have low modulus, low initial tensile yield strength and poor creep. As such, these films and sheet are *unacceptable* to make thin-walled carbonated beverage cans as modulus values of the *unoriented* films are from 2.5 to 5 times too low, and initial tensile yield values are about 3 to 4 times too low. Furthermore, high quality biaxially oriented polypropylene film, for example Hercules T-503 film, while having a high modulus, shows unacceptable initial tensile yield values, about 2 times too low. Monoaxially oriented polypropylene manufactured for strapping tape shows good modulus and initial tensile yield strength, but is much too thick to achieve a thin wall carbonated beverage can construction. Further, strapping tape is only available in *relatively narrow widths*.

Two proprietary technologies have been developed in oriented polypropylene film or sheet materials that overcome these past deficiencies, i.e. offer a combination of high modulus, high tensile yield strength with improved creep properties, and also have film or sheet widths which are satisfactory to practice the instant invention. Further, through these development efforts in this field, film or sheet material of oriented polypropylene with properties superior to oriented PET film or oriented PET blown carbonated beverage bottle materials have been developed. Prior to these developments, thin wall polypropylene carbonated beverage cans were not possible. Heretofore, many different composite cans have been made, such as cans for motor oil or food products and the like. However, these composite cans are not manufactured to withstand internal pressure as found in a carbonated beverage can.

We have discovered that cross plying of strength film materials at plus/minus angles to one another not only circumvents these deficiencies found in the past containers and methods, but also affords a method by which the hoop and axial stresses can be accommodated at the 2:1 relative ratio, making possible a thin-walled carbonated beverage can with oriented polyolefin or polypropylene wrapped film layers, with the oriented polyolefin or polypropylene showing high modulus and high tensile yield strength.

It has been discovered that highly oriented polyolefins can be used to manufacture a carbonated beverage can and that the use of the polyolefins results in acceptable modulus, creep and yield strength values and better modulus and yield strength values than commercially available PET or other polyester carbonated beverage containers. The higher the modulus, the thinner the can wall can be made for end seaming. This results in less use of thermoplastic materials in making the can and thus greater efficiency in the manufacture of the can.

The higher the modulus, the thinner the can wall that can be made and, thus, the more easily an aluminum end could be attached to the can body. It is necessary that a carbonated beverage can wall be sufficiently thin since a standard aluminum end or top may be attached to no more than about 30 mils thickness of can wall.

We have discovered that unidirectional wrapping leads to undesirable torquing and twisting of the can body in response to the unbalanced hoop and axial stresses in the can with pressurization, and that overcoming these unbalanced stresses by wrapping sufficient extra layers of material in one direction preclude the achievement of thin wall body material necessary for end attachment, etc. Clearly, such torquing and twisting is unacceptable from a graphics/aesthetic point of view for a decorated can.

SUMMARY OF THE INVENTION

The present invention resides in a method for producing a thin walled carbonated beverage can which has acceptable creep resistance, modulus and yield strength values, which comprises a can body, which is made up of a thermoplastic material, at least two layers of polypropylene film or sheet which is either monoaxially stretched or biaxially stretched and which is wrapped around the can body at plus-minus angles to yield sufficient strength and volume swell resistance in both hoop and axial directions; an adhesive layer which is placed between the core and the tape or tapes of polypropylene in order to adhere the tape or tapes to the core as well as the tape or tapes to themselves and at least one layer of a barrier material; and an end and top which are attached by some suitable method to the can body.

BRIEF DESCRIPTION OF THE DRAWINGS

FIG. 2 is a graph of hoop stress versus wall thickness for various internal pressures in a 12 ounce carbonated beverage can.

FIG. 5 is a graph of volume swell versus wall thickness for various wall material moduli in a 12 ounce carbonated beverage can.

FIG. 7 is a graph of stress versus strain for carbonated beverage can materials.

FIG. 8 is a graph of room temperature creep strain at 10,000 psi over a period of time for unoriented polypropylene, oriented polypropylene, creep resistant biaxially oriented polypropylene, monoaxially oriented polypropylene with a cap adhesive layer, and oriented PET film.

FIG. 9 is an illustration of stress resistance vectors of other relevant materials and the present invention.

FIG. 10 shows resultant hoop and axial stress resistance vectors for wrapped constructions where one highly monoaxially oriented layer is applied at unidirectional and variable constant angles.

FIG. 11 shows resultant stress resistance vectors for layered constructions where highly monoaxially oriented layers are applied at angles opposite (plus and minus) one another as compared to undirectional wrapped examples.

FIG. 12 shows the volume percent growth for high modulus low yield strength biaxially oriented polypropylene material wrapped convolutely onto a polypropylene core.

FIG. 13 shows the volume percent growth for improved creep resistant, high yield strength biaxially oriented polypropylene as a function of wrapping angle and as a function of plus/minus ply layer wrapping versus unidirectional wrapping.

FIG. 14 shows the rotational angle of twist found for the unidirectional wrapped body configuration.

FIG. 15 shows volume swell test results for monoaxially oriented polypropylene strength wrap material.

FIG. 16 shows summary of results for FIGS. 12, 13 and 15 where convolute wrap low yield strength biaxially oriented polypropylene film which has been crossplyed at 70 and 55 plus/minus angles are compared for volume swell.

FIG. 17 shows a can body with a core material and two layers of strength wrap material.

FIG. 18 is a schematic of the process for the continuous manufacture of container bodies, including extrusion of the core followed by wrapping of the layers and a plus/minus configuration.

DETAILED DESCRIPTION OF THE INVENTION

Figure 1:
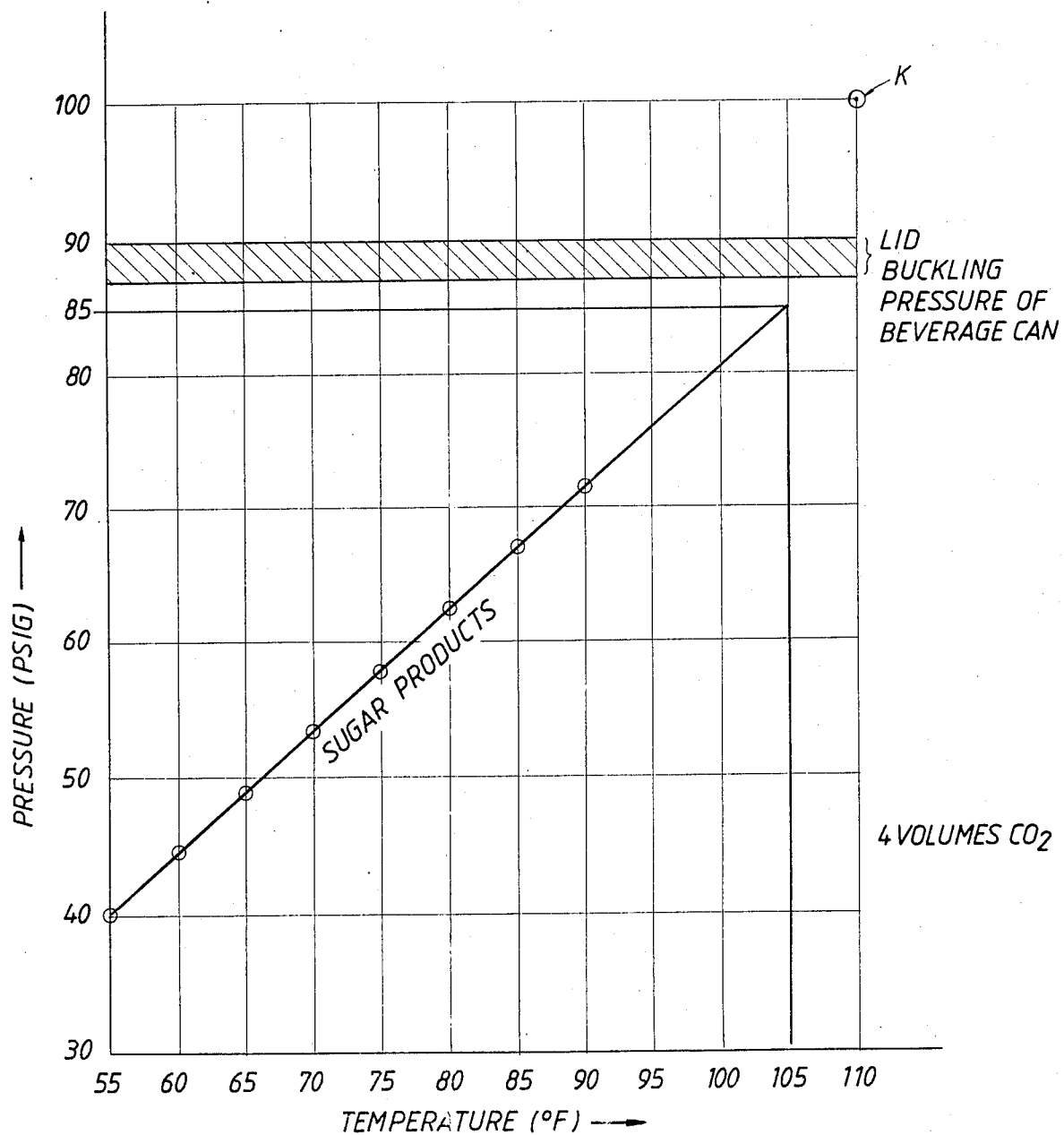
FIG. 1 is a graph of the pressure in a 12 ounce beverage can versus temperature.

FIG. 1 displays the combinations of pressures and temperatures typically found in a 12 ounce soft drink beverage can. The plotted line represents a 12 ounce can that has a carbonation level of four volumes of carbon dioxide in a sugar product soft drink. The heavy black line at 87 to 90 psig is the pressure at which a typical easy-open aluminum pull tab lid will buckle from internal pressure. This pressure, and corresponding temperature, determine the upper boundary conditions that must be satisfied in designing the can body to resist pressure (85 psig, 105° F.).

Also shown on this plot is a point, "K", at 100 psig and 110° F. This set of conditions, clearly more severe than those at which the top lid will buckle and fail, have been used to evaluate various wrapped can body constructions for volume swell, torquing and twisting, splitting and other functional performance factors.

FIG. 2 shows how these internal pressures in the can cause a corresponding stress in the can sidewall. This stress, in this case the hoop stress, is calculated on the basis of the geometry of the cylindrical shell can body with the radius of the can (r) and can body wall thickness of the can (t) in combination with the internal pressure governing the circumferential (hoop) stress. This hoop stress is found on the vertical axis.

For a 12 ounce can, the radius is approximately 1.29 inches. Various can body wall thicknesses are shown on the horizontal axis. Thus, for any given pressure and can body wall thickness a corresponding hoop stress can be calculated once the can radius is fixed.

This calculated hoop stress becomes an important design criteria in achieving a thin wall can body. As is seen in FIG. 2, plots for various internal pressures, the thinner the can body wall, the greater the hoop stress in the can body wall. Clearly, the can wall material must be able to resist the hoop stress found in order to not appreciably deform, stretch or creep, which would lead to unacceptable volume swell, splitting or catastrophic failure due to these processes.

The important can body wall material property that governs resistance to hoop stress forces is the tensile yield strength. The tensile strength of a material is the break point on the tensile stress/strain curve. Below the tensile yield point, little stretch deformation of the material is shown as stress is applied. Above the tensile yield point, considerable stretch deformation of the material is shown as the material easily yields, and permanently deforms without much resistance to stress. Thus, in making a thin walled can body, it is crucial that tensile yield properties of the can body wall material are sufficiently high so that the hoop stress in the can body sidewall is resisted, therefore precluding appreciable stretch deformation of the can wall material.

Figure 3:
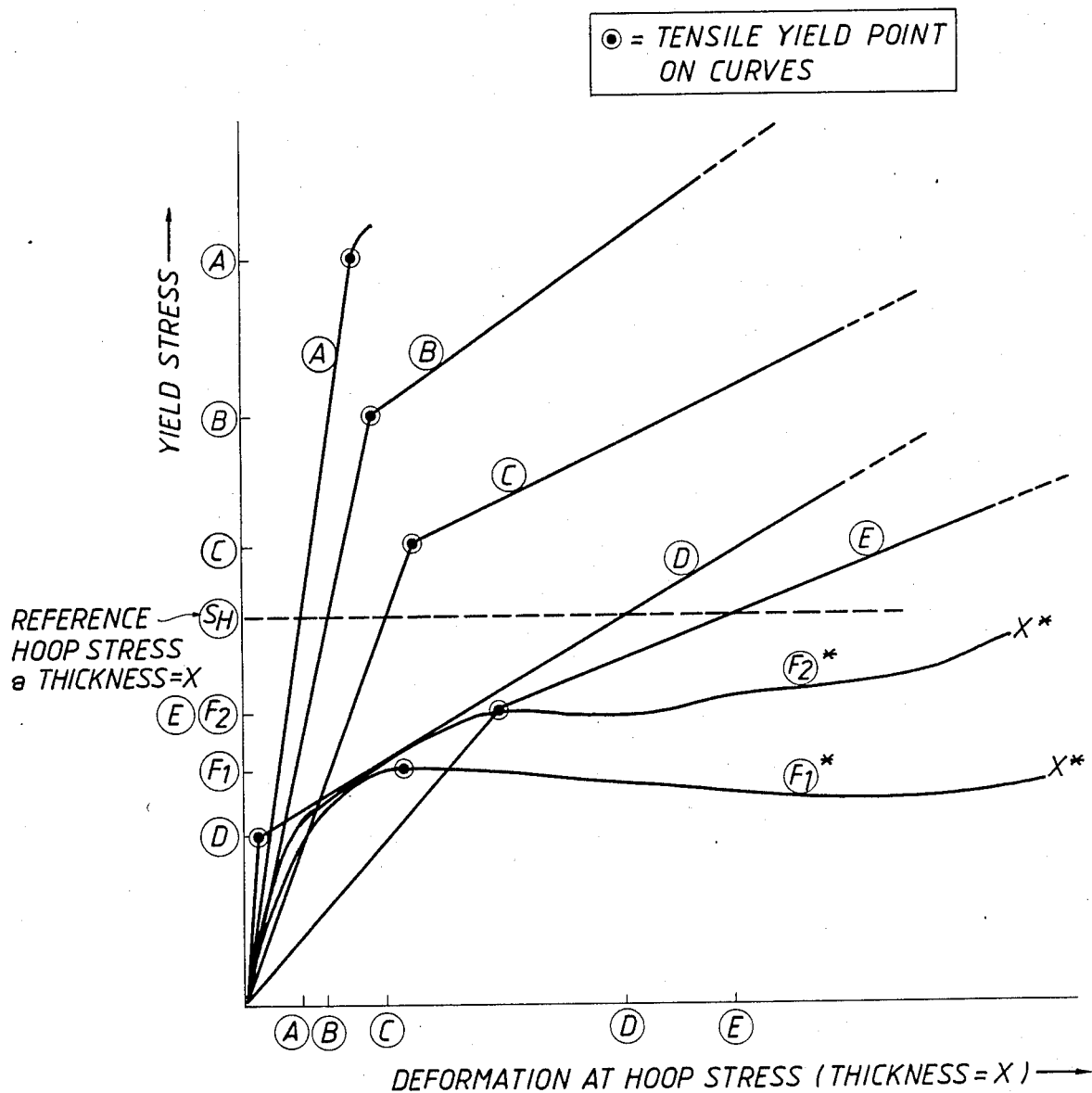
FIG. 3 is a graph of yield stress versus deformation for example materials above and below a reference hoop stress.

FIG. 3 is a representation of these principles for various illustrative examples. The tensile yield stress for various materials is shown on the vertical axis; corresponding deformation (stretch, strain) is shown on the horizontal axis. A reference hoop stress, as a function of a given can body wall thickness, radius and pressure, is chosen as a point at which these examples may be compared.

Curves A, B and C have tensile yield strength values above the reference hoop stress, "SH". These materials show little deformation at the reference hoop stress level. Curves D and E show tensile yield strength values below the reference hoop stress and correspondingly show significant deformation at the reference hoop stress. Curves $F_1$ and $F_2$ show tensile yield strength values below the reference hoop stress with tensile break strength values below the hoop stress as well. These materials will continue to deform until they fail by splitting or bursting when the reference hoop stress is found inside the container.

Figure 4:
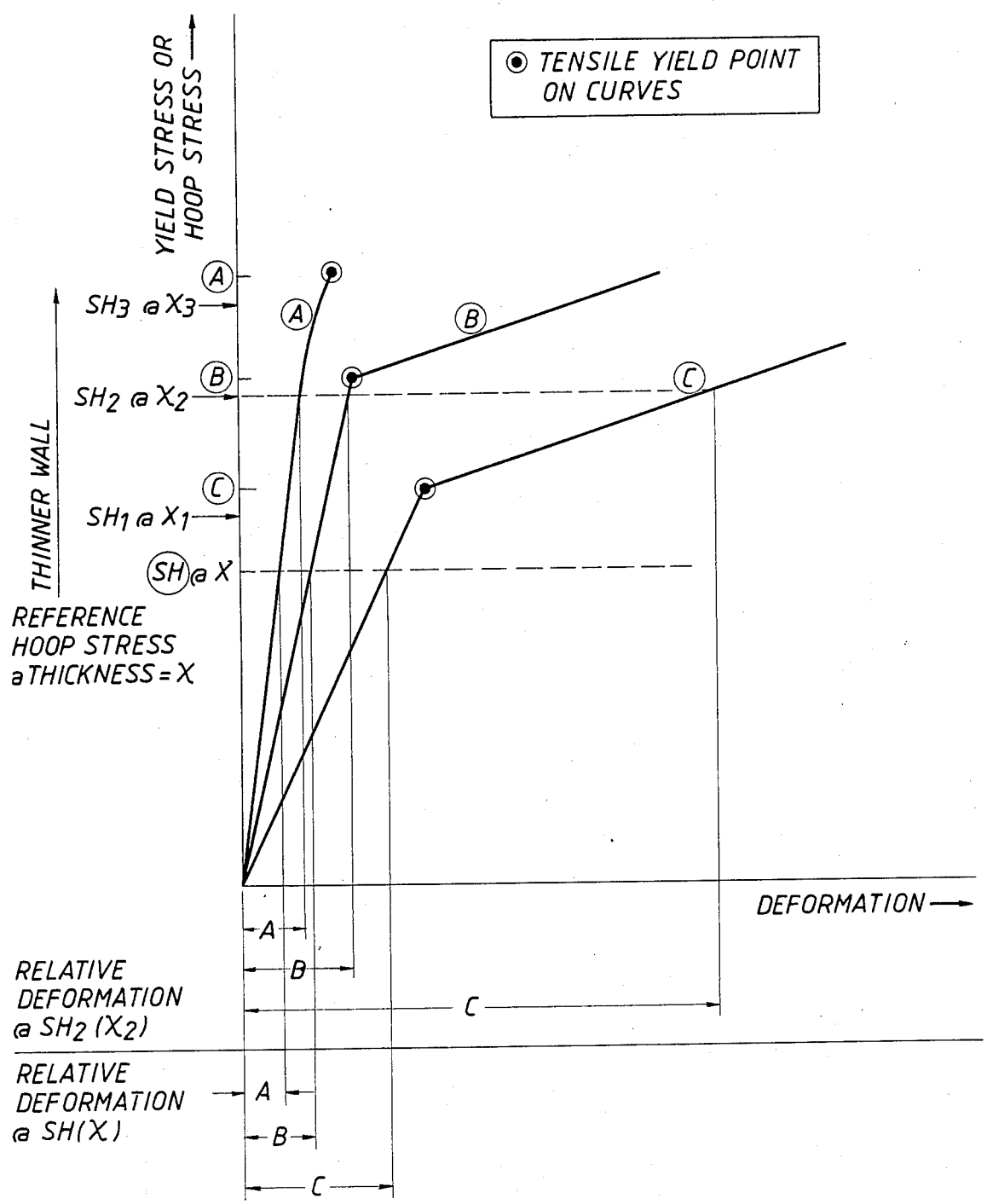
FIG. 4 is a graph of hoop stress versus yield stress and corresponding deformation as the can body wall is made thinner.

One key criteria, then, to producing a *thin* walled vessel is high tensile yield strength of the can body wall material. This is shown illustratively in FIG. 4. Curves A, B, C are repeated as shown in FIG. 3. Along the vertical axis we show the reference hoop stress at thickness=X as previously shown in FIG. 3. As the can body wall is made thinner, the hoop stress in the can body sidewall becomes increasingly higher, represented now by the vertical axis intercepts labeled $SH_1$, $SH_2$ and $SH_3$ at $X_1$, $X_2$ and $X_3$ wall thicknesses where $X_3 < X_2 < X_1 < X$. It is clear that the achievement of a *thinner* wall can body depends upon *high tensile yield strength* of the can body material in order to minimize deformation of the can wall when hoop stress increases as a function of decreasing wall thickness. For example, at $SH_2$ at thickness $X_2$, materials A and B will show much less deformation than material C. $SH_2$ is above the tensile yield strength of material C, thus a can body wall at thickness $X_2$ with material C will show a rather large deformation. Further, where X is the maximum allowable thickness for reasons of end seaming, light weighting, faster chilling of the can body, then materials represented by curves A, B, C will meet the criteria of tensile yield strength > hoop stress at thickness X, and thickness X < maximum allowable thickness for reasons of end seaming. light weighting, faster chilling, etc. of the can body. Other materials as previously shown in FIG. 3 (curves D, E, F, $F_2$) will deform too severely at thickness X, and will not meet these criteria.

FIG. 5 presents treatment of a second major criterion for achievement of a thin wall can body beverage can. In this figure, $\Delta V/V$, volume swell percent, is shown as a function can sidewall thickness for a 12 ounce beverage can where the internal pressure is 100 psig. The three curves shown represent the elastic modulus, E, of the can body sidewall material. Clearly, higher elastic modulus materials are preferred in order to minimize volume swell at thin can body sidewalls. For example, if we construct a horizontal line parallel to the horizontal axis at about 3% volume swell, we find that about 21 mils of 400 ksi elastic modulus material is equivalent to about 8 mils of 1000 ksi elastic modulus material to satisfy a volume swell of less than 3%.

Figure 6:
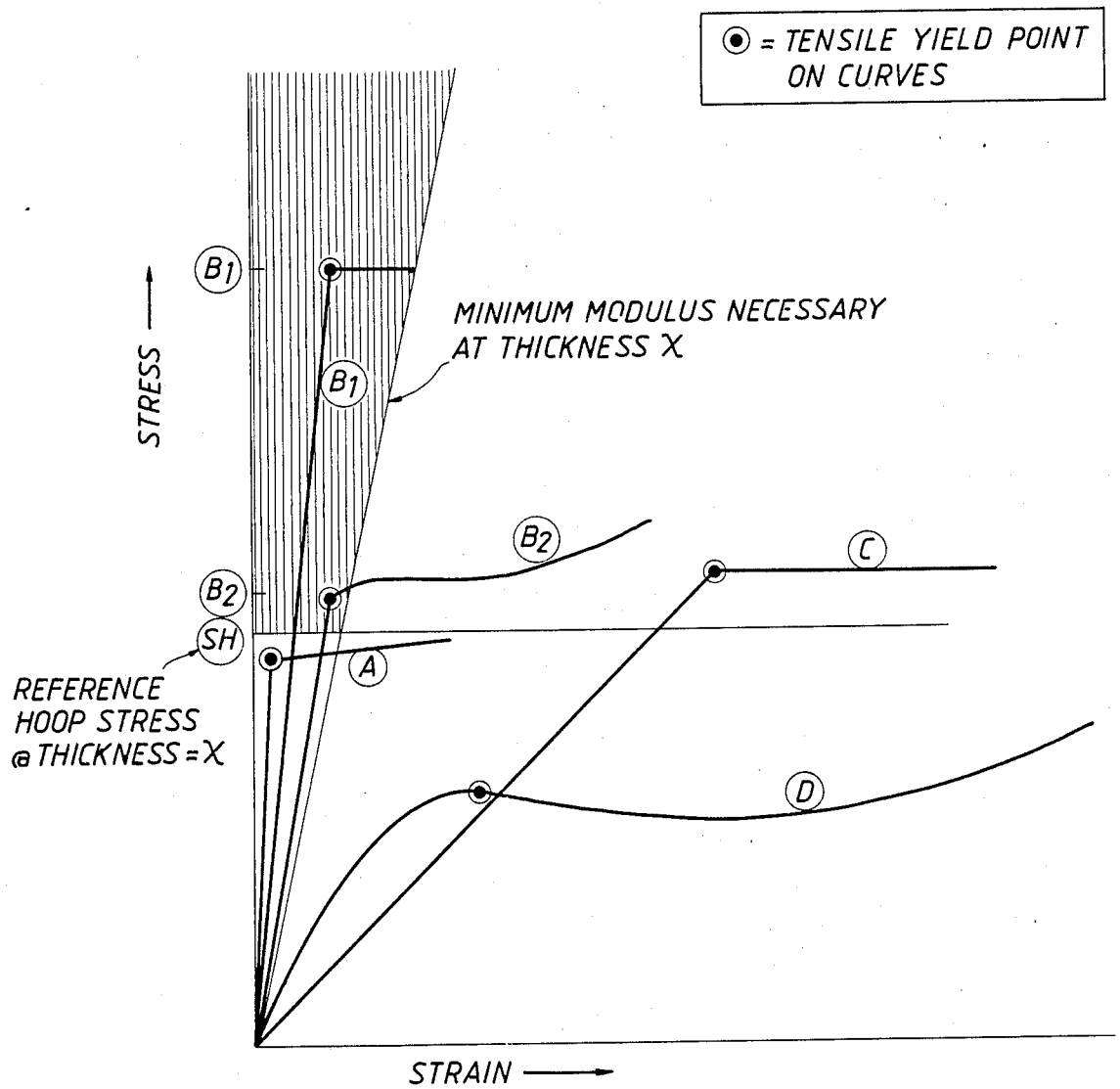
FIG. 6 is a graph of yield stress and modulus versus deformation for example materials above and below a reference hoop stress and reference modulus.

The importance of fulfilling both criterion, high tensile yield strength and high elastic modulus is shown in FIG. 6. The elastic modulus of a material is the measure of its ability to resist deformation under load up to a strain point at which permanent deformation (non-elastic, non-recoverable deformation) occurs. For plastic materials, as compared with metals, ceramics or thermosets, it is generally measured in the very early portion of a tensile stress/strain curve. The magnitude of the elastic modulus is the slope of the initial elastic deformation portion of the stress/strain curve. For materials having very high modulus, high stress causes very little strain (deformation). Low modulus materials, such as rubbery materials, show very low modulus, i.e. deform significantly under low stress.

In the context of a pressure vessel, in particular, a carbonated beverage can, the deforming stresses are a constant load. Materials having very high modulus will deform less significantly under this constant load. Therefore, volume swell of the can body will be minimized. However, this high elastic modulus is insufficient in itself to provide a thin-walled carbonated beverage container. The tensile yield strength must also be sufficiently high in combination with high modulus in order to achieve a thin-walled vessel.

FIG. 6 is a summary of illustrative examples of material stress/strain properties in terms of tensile modulus and tensile yield strength. The inset table in this figure summarizes the acceptability of mateials with respect to satisfying both the minimum elastic modulus criterion and the tensile yield strength criterion simultaneously. The red area shows the region of properties necessary in order to achieve thin wall can bodies. One object of the present invention is in meeting both criterion to achieve a thin wall can body with polyolefin polymers, polypropylene in particular. Heretofore, such a necessary combination of high modulus and high tensile yield strength precluded the use of unoriented and oriented polyolefins to make thin wall can bodies by prior art.

FIG. 7 and Table 1 summarizes measured stress/strain properties for highly oriented polypropylene film and sheet of the instant invention versus prior art polypropylenes and polyesters in thin gauge sheet or film suitable for wrapping. Table 1 also summarizes the elastic modulus and yield strength for different materials.

FIG. 8 is a graph of room temperature creep at 10,000 psi stress over a period of time of up to 300 hours, for unoriented polypropylene, oriented polypropylene, creep resistant biaxially oriented polypropylene, monoaxially oriented polypropylene with a cap adhesive layer and oriented PET film. As may be seen, the monoaxial oriented polypropylene with a cap adhesive layer (denoted by the triangles) has low creep strain, indeed lower than all but the OPET film, even after as many as 300 hours. The percent creep strain of this monoaxial oriented polypropylene with a cap adhesive layer ranges from $3\frac{1}{2}$ to 6 percent at 0 hours and 300 hours respectively.

FIG. 9 shows stress resistance vectors of the relevant materials and the present invention.

Case 9A shows stress resistance vectors which are equal to each other as is the case for homogeneous materials. Example materials are steel, aluminum, injection molded or wrapped film beverage cans. Homogeneous property materials provide no opportunity to balance the stress resistance vectors to optimize the hoop performance versus the axial performance. Thus, a larger than necessary stress resistance vector in the axial direction results. This results in the requirement of thicker walls of homogeneous materials.

Case 9B shows the stress resistance vectors for an unbalanced axial resistant can. Examples are thermoformed plastic or D&I (drawn and ironed) plastic cans. The primary stress resistant vector is in the axial direction due to thermoforming and orientation of plastic in the axial direction. Thus, a thicker wall must be used to overcome the hoop stress resistance deficiency. Axial and hoop properties are as shown in Table 1, item 7, types A, B, C for case 9B cans.

Case 9C shows unbalanced radial and axial stress resistance vectors for a can wall material with anisotrophic properties made by convolute wrapping. For a convolute wrapped can, the magnitude of these stress resistance vectors depends upon the exact can wall material properties in either direction, and continuous manufacture of endless can body lengths is not possible. Convolute wrapping of materials with isotrophic properties, i.e. equal in both directions, reverts to case 9A.

Case 9D shows balanced stress resistant vectors for the can of the present invention. The film or sheet is wrapped at plus/minus angles. This satisfies the bidirectional and unbalanced hoop and axial stress resistance with a stress resistance ratio in the hoop to axial direction of 2:1. This is optimum for this particular application. This results in a optimized use of materials to meet stresses while having a reduced wall thickness.

FIG. 10 shows resultant hoop and axial stress vectors for wrapped constructions where a highly monoaxially oriented layer (or layers) is applied at unidirection and variable constant angles (i.e., not our invention).

Case 10A shows one film layer being used to wrap the core at a film wrap angle of plus 90 degrees from a center perpendicular axis through the can. This type of wrap angle does *not* allow one to *continuously* manufacture the can. It results in unsatisfactory axial stress resistance. Thus, a thicker container wall must be used.

Case 10B shows wrapping of one film layer at a plus 55 degrees film wrap angle to the axis of the core. The hoop stress resistance vector shortens as the wrap angle changes and the axial stress resistance vector increases. Now, as compared to Case 10A, the hoop stress resistance vector must be satisfied by use of thicker wall material.

Case 10C shows one film layer wrapped at a 0 degree angle on the core. The axial stress resistance vector, as may be expected, is at its maximum but the hoop stress resistance vector has been lost. Thus, the hoop stress resistance vector must be satisfied in much thicker wall material.

FIG. 11 compares resultant stress resistance vectors for layered constructions where highly monoaxially oriented layers are applied at angles opposite (plus/minus) one another.

Case 11A shows one film layer wrapped at a plus 55 degree angle to the axis of the core. The hoop and axial stress resistant factors are unbalanced and insufficient to meet the hoop and axial design stress at a thickness of T/2. Also, torquing, twisting and splitting results when the can is pressurized. Thus, such a can would fail under carbonated beverage conditions.

Case 11B shows two film layers, both of which are wrapped at plus 55 degree angles to the axis of the core. The axial stress resistant factors here are improved, but are still insufficient to meet the hoop and axial design stress at wall thickness equals T. Torquing, twisting and splitting result when the can is pressurized. As a result, the can fails under the pressurized carbonated beverage conditions. If T, thickness, is equal to the maximum thickness constraint of the can, then a unidirectional wrap design will not satisfy carbonate beverage can needs.

Case 11C shows two film layers which are wrapped at plus/minus 55 degree angles to each other (our invention). The hoop and axial stress resistance factors are balanced and are sufficient to meet the hoop and axial design stress at wall equal T. No torquing, twisting or splitting takes place when the can is pressurized. The can meets thickness constraints as well as performance constraints.

Case 11D shows two film layers which are wrapped at 0 degrees and 90 degree angles to the axis of the core. This results in inefficient hoop and axial stress vectors at ratios of 1:1 (as in Case 9A). It is also *not* possible for this can to be *continuously* manufactured due to the wrapping constraints at a 90 degree angle.

Thus, only Case 11C illustrates the hoop and axial stress resistant factors which "work" for a carbonated beverage can which will withstand pressurization conditions of use with a *minimum* wall thickness. The two film layers are wrapped at plus/minus angles to each other although they need not be 55 degree angles. The monoaxially stretched film is wrapped preferably at an angle between 50 and 60 degrees and most preferably at about 55 degrees. Biaxially stretched film layers are wrapped preferably at an angle between about 60 and 80 degrees and most preferably at about 70 degrees.

TABLE 1

| Material Description | | Elastic Modulus Psi × 10³ | Yield Strength Psi × 10³ |
|---|---|---|---|
| Polyolefins | | | |
| *1. Highly oriented, monoaxial oriented polypropylene; no adhesive cap layer | MD TD | 1,610. Splitty | >68. Splitty |
| *2. Highly oriented, monoaxial oriented polypropylene; with adhesive cap layer | MD TD(est.) | 1,480. 271. | >60. 11.(est.) |
| *3. Improved creep resistant biaxially oriented polypropylene | MD TD | 400-600 240-400 | 8-12 5-6 |
| 4. Biaxially oriented polypropylene very high modulus T-503 (Hercules) | MD TD | 505 1,160 | 4.9 5.9 |
| 5. Unoriented polypropylene, homopolymer | | 200 | 4.8 |
| PETS | | | |
| 6. Unoriented PET | | 140-230 | 8.0 |
| 7. Thermoformed PET | | | |
| Type A | Axial Hoop | 460 266 | 12.0 10.0 |
| Type B | Axial Hoop | 711 260 | 21.0 8.8 |
| Type C | Axial Hoop | 851 259 | 23.0 9.7 |
| 8. OPET biaxially oriented film | MD/TD | ~500 | 15.21 |

*present invention

The three materials asterisked (*) represent the materials of the present invention. As may be seen, material #4 has elastic modulus greater than the required 400,000 psi but does not have the 8,000 psi yield strength required. Material #5 does not meet either requirement. Material #6 barely meets the yield strength requirement but does not have a great enough elastic modulus. Material #7 does not meet the modulus requirements in both the hoop and axial directions, as is required. Material #8 meets the yield strength requirements and the elastic modulus requirements but is a PET film.

In addition to high modulus and high tensile yield strength, longer term resistance to deformation under stress (creep) is also an important consideration for a carbonated beverage container body material wherein the contents produce a static pressure. FIG. 8 compares this creep behavior of various materials under 10,000 psi stress. Examples C and D correspond to materials 2 and 3 in FIG. 7 and Table 1. When compared with unoriented polypropylene, example A, or state of art BOPP, example B, materials C and D having high modulus and high tensile yield strength show significant improvement in resistance to long term static load deformation at 10,000 psi. This is also important in minimizing the long term volume swell of a beverage can when thin wall can body materials are used. Creep properties for OPET film are also shown for reference.

We have discovered that polyolefin film or sheet materials, said film or sheet oriented either monoaxially or biaxially to achieve a combination of high modulus, high tensile yield strength and improved creep resistance, preferably oriented monoaxially, can be fabricated to produce thin wall can bodies that resist hoop stresses and minimize volume swell, such thin wall structure having been previously unattainable with polyolefin materials.

Another object of the present invention is the fabrication of these materials to produce thin-walled vessels with balanced stress resistant properties.

Initially, a core is produced by first making a core of any thermoplastic material such as a polyolefin, although usually polypropylene, and, more preferably, coextruded polypropylene or co-extruded polypropylene layer, tie layer, and barrier layer are used to make the core. For example, in the preferred embodiment, the core would be made by extruding polypropylene or perhaps a polypropylene/tie layer/barrier/tie layer/polypropylene layer into a tubular core which then may be used to produce the can body by methods such as winding film around the core supported on a mandrel and subjecting it to heat to hold the film together. Alternatively, pressure sensitive film can be wound and will adhere without the usage of heat activation or heat bonding.

In the case of the coextrusion, a tie layer such as Admer ®, available from Mitsui of Japan, Modic ®, available from Mitsubishi of Japan, or Plexar ®, available from Norchem, or CXA ®, available from DuPont, may be used, although a tie layer is certainly not limited to these materials. The tie layer merely needs to be a type of adhesive which will bond layered structures such as polypropylene/tie layer/barrier layer/tie layer/polypropylene together.

The barrier layer may be ethylene vinyl alcohol copolymers (EVAL ® available from Evalca) or (Saran ®, available from Dow Chemical), although the barrier layer is not necessarily limited to these two materials.

Film layers of polyolefin are produced and are stretched (oriented) in one or two directions. If the film is stretched in only one direction, it is referred to as monoaxially oriented film. If the film is stretched in two directions, then the film is referred to as biaxially oriented film. The film is slit into appropriate widths and then at least two film layers of the polyolefin are wrapped around the core at an angle to yield sufficient strength and volume swell resistance in both hoop and axial directions.

Preferably, two film layers are used which have been monoaxially oriented and which are wound around the core at angles between positive 50 and 60 degrees in one direction and minus 50 and 60 degrees in the opposite direction relative to the can cylinder axis to yield sufficient strength and volume swell resistance in both hoop and axial directions.

The adhesive layer is placed between the core and the film layers in order to adhere the film layers to the core and is also placed between the film layers themselves so as to adhere the film layers to themselves. The adhesive may be a Kraton ® elastomer available from Shell Oil Company, PVDC (polyvinilidine chloride, available from Dow Chemical Company), a polybutene-1, a polybutane-1 copolymer, or a polybutene-1/polypropylene blend, available from Shell Oil Company, and the like. Most preferably, the adhesive is in the form of a polybutene-1 "cap" layer which is attached contiguous to the film by some method such as coextrusion, hot lamination, or some other method. The polybutene-1 acts as a "cap" layer and will soften when activated with heat or friction, and thereby provides an adhesive for bonding the polyolefin film or films with themselves as well as the core. The adhesive may be heat activated or may be pressure sensitive.

At least one layer of barrier material is placed either in the core or contiguous to either the core, the film layers of polyolefin or the adhesive layer. The barrier material may, for example, be EVOH, or Saran or the like. The barrier layer is preferably coextruded as part of the core where the core is made up of, preferably, a polyolefin, and most preferably, a coextruded polypropylene layer, with a tie layer (Admer, Modic, Plexar or CXA as previously discussed) and a barrier layer. The barrier layer may be coextruded or may be applied as a coating or a film, or may be included in the can by some other means.

The core is wrapped with the film of polyolefin, the adhesive layer and the barrier material layer unless the barrier material layer is coextruded as part of the core. This wrapped core is referred to at this point as the "can body".

Ends are then attached to the can body by some suitable method. Aluminum ends can be double-seamed or barrier sheet formed ends (PP/tie layer/barrier/tie layer/PP) can be spin welded. A tape-type easy open feature could be used as could any other suitable ends for attachment. A bottle neck could be spin welded or attached by some other suitable means to the can body. If an aluminum appearance is desired, the film can be metallized which gives additional barrier properties and good graphics. The ends may be either metal or plastic or some other suitable material. For example, the ends could be made of composites which are made of both metal and plastics. The composite could either be in the form of a plastic/metal/plastic laminated composite or a metal sealing ring round a plastic disk. The latter type of end could be made by insert injection molding. The sealing of the ends to the can body can be done by mechanical means. For example, single seaming, double seaming or by a welding process, such as spin welding or induction heating. Or, both a mechanical and a welding process could be used together.

In addition, layers of non-plastics, such as aluminum, steel, paper or the like may be added in making the can itself.

The next group of figures show results for pressure tested can bodies made according to the present invention. Comparisons are made with prior art films and prior art wrapping approaches.

Experiment I

Test specimens were fabricated by first extruding a polypropylene core about 2.6 inches in diameter having a cylinder wall thickness of about 13 mils. Pressure sensitive adhesive was used to bond the wrapped film or sheet layers to this core surface and to one another. Specimens 8 to 10 inches in length were cut from the wrapped corestock, then clamped and sealed onto metal end plugs. One end plug is suitable for connection to a pressure source. Specimens and end plugs were then immersed in a water bath at test temperature (usually 110° F.) and the inner specimen cylinder volume allowed to fill with the warm bath water. Specimens were then connected to the pressure sources by means of a fitting at one end plug. Specimens were supported only at this connection end thus allowing the can body specimen to freely swell, bend, twist, etc. in any direction (axially, radially, torsionally) once pressurized. Most tests were performed at 100 psig. Volume swell was then measured as a function of time under these conditions of temperature and pressure. The method used to determine volume swell used photography, and measurements made from photographs which recorded dimensional change in the diameter and length of the specimen as compared to its initial dimensions at various times. This proved to be a simple technique: A camera was mounted above the immersed specimens and at various times a photograph was taken. Prints were developed, specimen dimensions were measured, volume swell was calculated and finally volume swell was plotted as a function of time. Specimens were generally held at this pressure and temperature for a four hour period.

FIG. 12 shows the volume percent growth for high modulus, *low* yield strength biaxially oriented polypropylene material wrapped convolutely onto a 13 mil polypropylene core. At film thicknesses of 8 mils or 10 mils of this pressure sensitive adhesive coated strength wrap material and pressurization to 100 psig at 100° F., these examples show a volume swell of over 100% in a time period of less than 10 seconds, followed by bursting. This is clearly unacceptable performance for a carbonated beverage container and shows that prior art biaxially oriented film is unsatisfactory. Photographs 1 and 2 have been added to illustrate a 13 mil polypropylene bladder which has been wrapped with ten layers of Hercules T-503 film. Photograph 2 is of the Photograph 1 specimen after eight (8) seconds pressurization at 100 psig, 110° F. Volume swell is calculated from photographic dimensions to be 112 percent.

FIG. 13 shows the volume percent growth for improved creep resistant, high yield strength biaxially oriented polypropylene as a function of wrapping angle (50 degrees versus 70 degrees) and as a function of plus/minus ply layer wrapping (balanced) versus unidirectional wrapping. Twelve layers of one-mil thickness pressure sensitive adhesive coated film were used for all three examples shown wrapped onto a 13 mil wall thickness polypropylene core. The can body wall thickness is about 33 mils for these examples. The two "balanced" examples have two-3 ply layers at the plus angle specified (either plus 50 or plus 70 degrees) and two-3 ply layers at the minus angle specified (either minus 50 or minus 70 degrees). As disclosed in Table 1 reference FIG. 7 this improved creep resistant biaxially oriented polypropylene has a combination of high modulus (about 500,000 psi) and high yield strength (greater than 8,000 psi) in at least one orientation direction, in this case the machine direction (M.D.). The results in this figure are shown as percent volume growth versus time in hours at 100 psig and 110° F.

From these results it is shown that plus/minus wrapping is essential to minimizing volume swell. For example, note the four-hour results comparing the 70 degree wrapped structures, balanced and one direction wrapping, wherein the one direction wrapped construction exhibits about twice the volume swell shown for the balanced (plus/minus) wrapped construction.

Secondly, we note the importance of wrapping angle chosen for balanced, plus/minus constructions: Clearly, for this strength wrap material an angle of plus/minus 70 degrees is advantageous versus the angle of plus/minus 50 degrees. A reduction of volume swell equal to about 50%, from about 20% measured volume swell as compared with about 10% volume swell, is found for the 70 degree angle of wrapping versus the 50 degree angle of wrapping for these plus/minus examples.

The achievement of thin wall can bodies for pressurized beverage containers necessarily relies on a combination of specific strength wrap material properties as Applicants have disclosed wherein such properties are most efficiently expressed via cross-plying of layers in plus/minus configuration, and so doing at an angle of wrap that substantially minimizes volume swell of the thin can body wall container under pressure.

Cross-plying of layers in a plus/minus configuration also prevents torquing and twisting of the can body. FIG. 14 shows the rotational angle of twist found for the unidirectional wrapped body configuration (curve 1D, FIG. 13) as previously discussed. Balanced configurations, (plus/minus wrapped can bodies), do not exhibit twisting. Twisting or torquing is not acceptable for a carbonated beverage can as it caused distortion of graphics, decoration, printing or labeling on the can body surface. Applicants invention prevents this distortion.

FIG. 15 shows volume swell test results for monoaxially oriented polypropylene strength wrap material as disclosed in Table 1 reference FIG. 7, for materials 1 and 2. Testing conditions were altered slightly to better reflect a maximum temperature and pressure likely to be found when a metal end seamed beverage can top will buckle (namely 85 psig and 105° F. as shown in FIG. 1) and to allow time to simulate cooling of the can to room temperature/corresponding pressure, followed by a simulation of refrigeration/corresponding pressure in monitoring volume swell and recoverable volume swell. This series of tests was run sequentially with 4 hours at 85 psig/105° F. followed by 20 hours at 60 psig/78° F. followed by 4 hours at 40 psig/55° F. This series of tests are labeled "HOT TEMP" in FIG. 15. A second series of tests were performed wherein only the pressure was changed according to this sequence while the water bath temperature was maintained at 78° F. throughout. This series is labeled as "ROOM TEMP" in FIG. 15.

These monoaxially oriented polypropylene strength wrap materials were 3.5 or 4.0 mils in thickness. As disclosed, both materials have very high modulus and very high yield strength (Table 1 reference FIG. 7). Only two layers of these materials were used, thus the total strength wrap material thickness for these test specimens was 7 mils or 8 mils respectively. Layers were applied at plus/minus wrap angles of about ±55 degrees to form the cross-plied configuration. Layers were bonded to the 13 mil core and to each other with about a one-mil (dry) pressure sensitive adhesive painted on from solvent. For these examples, the total can body wall is about 22 to 23 mils, including a 13 mil thickness core, 7 or 8 mils of strength wrapped sheet material and 2 mils of pressure sensitive adhesive. Either material 1 or material 2 showed excellent resistant to volume swell in the room temperature test, with material 2 showing less than about 4% volume swell and somewhat better performance than material 1. For the hot temperature test, material 2 showed a significant advantage in volume swell resistance as compared to material 1. This material is integrally cap coated as disclosed in Table 1 reference, FIG. 7, and a significant contribution to reduced volume swell may be attributed to transverse direction (T.D.) sheet properties not found in material 1. Applicants point out that data for material 1 at hot temperature conditions ends at two hours into the test sequence. A tear in the clamped area caused a split in the outer wrap layer that led to an early failure of this specimen. While data is not shown for unidirectional wrapped specimens of these materials, 3 to 4 plies of these materials wrapped without cross-plying result in rapid splitting of the film layers, torquing, twising and subsequent failure.

FIG. 16 summarizes results for FIGS. 12, 13 and 15 where (a) convolute wrapped low yield strength biaxially oriented polypropylene film, (b) cross-plied at 70 degree plus/minus angles improved creep resistance, high yield strength biaxially oriented polypropylene film and (c) cross-plied at 55 degree plus/minus angles very high yield strength, very high modulus monoaxially oriented polypropylene sheet are compared for volume swell at conditions where pressure is greater than 85 psig and temperature is greater than 105° F.

FIG. 17 shows a simple and illustrative can body with core material and two layers of strength wrap material.

FIG. 18 shows a process schematic for continuous manufacture of container bodies, including extrusion of the core followed by wrapping of the layers in a plus/minus configuration by opposite rotating heads holding strength wrap material, followed by a puller and cutting device.

Various other illustrative embodiments of this invention may be apparent to one of ordinary skill in the art and this invention is not limited to the particular examples used herein.

We claim:

1. A thin-wall carbonated beverage can with acceptable creep, modulus and yield strength values, which comprises:
   a can body which is less than 80 mils thick, which comprises:
   a core of a thermoplastic material; at least two layers of a film or sheet of an extruded non-fibrous polyolefin material, both of which have been either monoaxially stretched or biaxially stretched to a tensile yield strength of above 8,000 psi in any one direction, and to an elastic modulus of above 400,000 psi in any one direction, the first layer of which is wrapped around said core singularly or in plys at an angle from the axial direction of said core of greater than 0° and less than +90° and the second layer of which is wrapped around said core singularly or in plys at an angle from the axial direction of said core of the negative value of the angle of the first layer;
   an adhesive layer which is placed between said core and said layers of polyolefins in order to adhere said layers to said core as well as said layers to themselves; and
   at least one layer of barrier material which is either in said core or contiguous to either said core, said layers of polyolefin or said adhesive layer; and
   ends which are attached to said can body.

2. The carbonated beverage can of claim 1, wherein said core is made of a polyolefin.

3. The carbonated beverage can of claim 1, wherein said core is made of extruded polypropylene or coextruded polypropylene layer, tie layer and barrier layer.

4. The carbonated beverage can of claim 1, wherein said two layers of polyolefin which have each been monoaxially stretched, are wrapped around said core.

5. The carbonated beverage can of claim 1, wherein the first of said two layers which have been biaxially stretched is wrapped around said core singularly or in plys at an angle from the axial direction of said core of from about +60° to about +80° and the second of said two layers is wrapped around said core singularly or in plys at an angle from the axial direction of said core of the negative value of the angle of the first layer.

6. The carbonated beverage can of claim 1, wherein the first of said two layers which have been monoaxially stretched is wrapped around said core singularly or in plys at an angle from the axial direction of said core of from about +50° to about +60° and the second of said two layers is wrapped around said core singularly or in plys at an angle from the axial direction of said core of the negative value of the angle of the first layer.

7. The carbonated beverage can of claim 1, wherein said adhesive contains polybutene-1, or copolymers thereof.

8. The carbonated beverage can of claim 1, wherein said adhesive is contiguous to at least one side of said polyolefin layers.

9. A thin-wall carbonated beverage can with acceptable creep, modulus and yield strength values, which comprises:
   a can body which is less than 80 mils thick, which comprises:
   a core of coextruded non-fibrous polypropylene layer, tie layer and barrier layer; two layers of polypropylene, both of which have been monoaxially stretched to a tensile yield strength of above 8,000 psi in any one direction and to an elastic modulus of above 400,000 psi in any one direction, the first layer of which is wrapped around said core singularly or in plys at an angle from the axial direction of said core of from about +50° to about +60° and the second layer of which is wrapped around said core singularly or in plys at an angle from the axial direction of said core of the negative value of the angle of the first layer; and
   an adhesive layer which is contiguous to at least one side of said polypropylene layers in order to adhere said layes to said core as well as to said layers themselves; and
   ends which are attached to said can body.

10. The carbonated beverage can of claim 9, wherein said adhesive contains polybutylene-1, or copolymers thereof.

11. A method of manufacturing a carbonated beverage can which has acceptable creep, modulus and yield strength values, which comprises the steps of:
    manufacturing a core of a thermoplastic material;
    extruding at least two layers of a non-fibrous polyolefin film;
    stretching both of said two layers either monoaxially or biaxially;
    wrapping said layers of polyolefin film around said core, wherein the first layer of which is wrapped around said core singularly or in plys at an angle from the axial direction of said core of greater than 0° and less than +90° and the second layer of which is wrapped around said core singularly or in plys at an angle from the axial direction of said core of the negative value of the angle of the first layer;
    placing an adhesive layer between said core and said layers of polyolefin film in order to adhere said layers to said core as well as said layers to themselves;
    placing at least one layer of barrier material either in said core or contiguous to either said core, said layers of polyolefin film, or said adhesive layer, where said core wrapped with said layers of polyolefin film, said adhesive layer and said barrier material layer is a can body; and
    attaching ends to said can body.

12. The method of claim 11, wherein said core is made of polyolefin.

13. The method of claim 11, wherein said core is made of extruded polypropylene or coextruded polypropylene layer, tie layer and barrier layer.

14. The method of claim 11, wherein two layers of polyolefin film which have been monoaxially stretched, are wrapped around said core.

15. The method of claim 14, wherein the first of said two layers which have been monoaxially stretched is wrapped around said core singularly or in plys at an angle from the axial direction of said core of from about +50° to about +60° and the second layer of which is wrapped around said core singularly or in plys at an angle from the axial direction of said core of the negative value of the angle of the first layer.

16. The method of claim 11, wherein said adhesive contains polybutene-1.

17. The method of claim 11, wherein said adhesive is contiguous to at least one side of said polyolefin film.

18. The method of claim 17, wherein said core is made of extruded polypropylene or coextruded polypropylene layer, tie layer and barrier layer.

19. The method of claim 17, wherein said two layers of polyolefin film which have each been monoaxially stretched and are wrapped around said can body, are polypropylene.

20. The method of claim 17, wherein the first of said two layers which have been monoaxially stretched is wrapped around said core singularly or in plys at an angle from the axial direction of said core of from about $+50°$ to about $+60°$ and the second of said two layers is wrapped around said core singularly or in plys at an angle from the axial direction of said core of the negative value of the angle of said first layer.

21. The method of claim 17, wherein said adhesive contains polybutene-1.

22. The method of claim 17, wherein said adhesive contains is contiguous to at least one side of said polyolefin film layers.

23. A method of manufacturing a carbonated beverage can which has acceptable creep, modulus and yield strength values, which comprises the steps of:
manufacturing a core of polypropylene;
extruding at least two layers of a non-fibrous polyolefin film;
monoaxially stretching said non-fibrous polyolefins film layers;
wrapping said layers of non-fibrous polyolefin film around said core wherein the first layer of which is wrapped around said core singularly or in plys at an angle from the axial direction of said core of greater than 0° and less than $+90°$ and the second layer of which is wrapped around said core singularly or in plys at an angle from the axial direction of said core of the negative value of the angle of said first layer;
placing an adhesive layer between said core and said layers of polyolefin film in order to adhere said layers to said core as well as said layers to themselves;
placing at least one layer of barrier material either in said core or contiguous to either said core, said layers of polyolefin film or said adhesive layer, which said core wrapped with said layers of polyolefin film, said adhesive layer and said barrier material layer is a can body; and
attaching ends to said can body.

24. A method of manufacturing a carbonated beverage can which has acceptable creep, modulus and yield strength values, which comprises the steps of:
extruding a core of coextruded polypropylene layer, tie layer and barrier layer;
extruding at least two layers of non-fibrous polypropylene film;
monoaxially stretching said layers of polypropylene film;
wrapping the first of said layers of polypropylene film around said core singularly or in plys at an angle from the axial direction of said core of from about $+50°$ to about $+60°$ and the second of said polypropylene film layers is wrapped around said core singularly or in plys at an angle from the axial direction of said core of the negative value of the angle of said first layer;
placing an adhesive layer contiguous to at least one side of said polypropylene film layers in order to adhere said layers to said core as well as to said layers themselves, where said core wrapped with said layers of polypropylene film, said adhesive layer and said barrier material layer is a can body; and
attaching ends to said can body.

25. The method of claim 24, wherein said adhesive contains polybutene-1 or copolymers thereof.

* * * * *